US012006245B2

(12) United States Patent
Liu et al.

(10) Patent No.: US 12,006,245 B2
(45) Date of Patent: Jun. 11, 2024

(54) LASER FORMING NON-SQUARE EDGES IN TRANSPARENT WORKPIECES USING LOW INTENSITY AIRY BEAMS

(71) Applicant: CORNING INCORPORATED, Corning, NY (US)

(72) Inventors: Anping Liu, Horseheads, NY (US); Craig John Mancusi Ungaro, Corning, NY (US)

(73) Assignee: Corning Incorporated, Corning, NY (US)

( * ) Notice: Subject to any disclaimer, the term of this patent is extended or adjusted under 35 U.S.C. 154(b) by 291 days.

(21) Appl. No.: 17/403,987

(22) Filed: Aug. 17, 2021

(65) Prior Publication Data
US 2022/0081342 A1    Mar. 17, 2022

Related U.S. Application Data

(60) Provisional application No. 63/077,195, filed on Sep. 11, 2020.

(51) Int. Cl.
  *C03B 33/02*     (2006.01)
  *B23K 26/00*     (2014.01)
  (Continued)

(52) U.S. Cl.
  CPC ...... *C03B 33/0222* (2013.01); *B23K 26/0006* (2013.01); *B23K 26/009* (2013.01); *C03B 33/04* (2013.01); *B23K 2103/54* (2018.08)

(58) Field of Classification Search
  CPC .............................. C03B 33/02; B23K 26/38
  See application file for complete search history.

(56) References Cited

U.S. PATENT DOCUMENTS

| 8,101,929 B1 * | 1/2012 | Christodoulides ..... G02B 27/56 |
| | | 250/493.1 |
| 9,757,815 B2 | 9/2017 | Hosseini |

(Continued)

FOREIGN PATENT DOCUMENTS

| CN | 103018918 A * | 4/2013 |
| CN | 103018918 A | 4/2013 |

(Continued)

OTHER PUBLICATIONS

International Search Report and Written Opinion of the International Searching Authority; PCT/US2021/047661; dated Jan. 19, 2022; 11 pages; European Patent Office.

(Continued)

*Primary Examiner* — Alison L Hindenlang
*Assistant Examiner* — Steven S Lee
(74) *Attorney, Agent, or Firm* — Kevin L. Bray

(57) ABSTRACT

A method for processing a transparent workpiece that includes directing a laser beam output by a beam source onto a phase-adjustment device such that the laser beam downstream the phase-adjustment device is an Airy beam and directing the Airy beam onto a surface of the transparent workpiece. The Airy beam forms an Airy beam focal region in the transparent workpiece, the Airy beam of the Airy beam focal region having a maximum intensity of 100 TW/cm$^2$ or less, the Airy beam of the Airy beam focal region induces absorption in the transparent workpiece, the induced absorption producing a curved defect in the transparent workpiece.

19 Claims, 18 Drawing Sheets

(51) Int. Cl.
*C03B 33/04* (2006.01)
*B23K 103/00* (2006.01)

(56) References Cited

U.S. PATENT DOCUMENTS

| | | | |
|---|---|---|---|
| 10,494,290 B2 | 12/2019 | Chen et al. | |
| 10,620,444 B2 | 4/2020 | Kumkar et al. | |
| 2005/0173388 A1* | 8/2005 | Lavers | B23H 9/10 205/665 |
| 2010/0315636 A1* | 12/2010 | Spriggs | G02B 27/46 356/336 |
| 2013/0050838 A1* | 2/2013 | Nagano | B23K 26/0648 359/641 |
| 2014/0027951 A1* | 1/2014 | Srinivas | B23K 26/009 264/400 |
| 2015/0038313 A1* | 2/2015 | Hosseini | B23K 26/0648 219/121.75 |
| 2015/0165562 A1* | 6/2015 | Marjanovic | C03B 33/0222 219/121.72 |
| 2015/0166393 A1* | 6/2015 | Marjanovic | B23K 26/0624 65/61 |
| 2015/0205137 A1* | 7/2015 | Soskind | G02B 27/0988 359/350 |
| 2016/0016257 A1* | 1/2016 | Hosseini | B23K 26/0006 65/355 |
| 2016/0048032 A1* | 2/2016 | Soskind | G02B 27/0927 359/559 |
| 2016/0159679 A1* | 6/2016 | West | B23K 26/064 65/355 |
| 2017/0023841 A1* | 1/2017 | N'Gom | G02F 1/1533 |
| 2017/0189991 A1* | 7/2017 | Gollier | G02B 7/10 |
| 2017/0203994 A1* | 7/2017 | Chen | C03B 33/0222 |
| 2017/0276951 A1* | 9/2017 | Kumkar | B23K 26/066 |
| 2018/0016179 A1 | 1/2018 | Canfield et al. | |
| 2018/0062342 A1* | 3/2018 | Comstock, II | B23K 26/0624 |
| 2018/0093914 A1* | 4/2018 | Akarapu | B23K 26/0608 |
| 2018/0221988 A1* | 8/2018 | Liu | B23K 26/0624 |
| 2022/0073427 A1* | 3/2022 | Ortner | C03C 23/0025 |

FOREIGN PATENT DOCUMENTS

| | | | | |
|---|---|---|---|---|
| CN | 104216121 A | * | 12/2014 | |
| CN | 104216121 A | | 12/2014 | |
| CN | 104765153 A | * | 7/2015 | G02B 27/09 |
| CN | 104765153 A | | 7/2015 | |

OTHER PUBLICATIONS

Mathis A et al: "Micromachining along a curve: Femtosecond laser micromachining of curved profiles in diamond and silicon using accelerating beams", Applied Physics Letters, A I p Publishing LLC, US, vol. 101, No. 7, Aug. 13, 2012, 11 pages.

Ahmed et al., "Display glass cutting by femtosecond laser induced single shot periodic void array", Applied Physics Letters, vol. 93, 2008, pp. 189-192.

Gecevicius et al., "Airy beams generated by ultrafast laser-imprinted space-variant nanostructures in glass", In Optics Letters, vol. 39, 2014.

Mathis et al., "Micromachining along a curve: Femtosecond laser micromachining of curved profiles in diamond and silicon using accelerating beams", In Applied Physics Letters, vol. 101, 2012, 3 pages.

Mezentsev et al., "Femtosecond laser microfabrication of subwavelength structures in photonics", Proceesings of SPIE, vol. 6107, 20017, 11 pages.

Polynkin et al., "Curved Plasma Channel Generation Using Ultraintense Airy Beams", Science, vol. 324, 2009, pp. 229-232.

Stuart et al., "Nanosecond-to-femtosecond laser-induced breakdown in dielectrics", Physical Review B, vol. 53, 1996, 13 pages.

Sudrie et al., "Femtosecond Laser-Induced Damage and Filamentary Propagation in Fused Silica", Physical Review, vol. 89, 2002, 4 pages.

\* cited by examiner

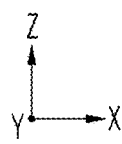
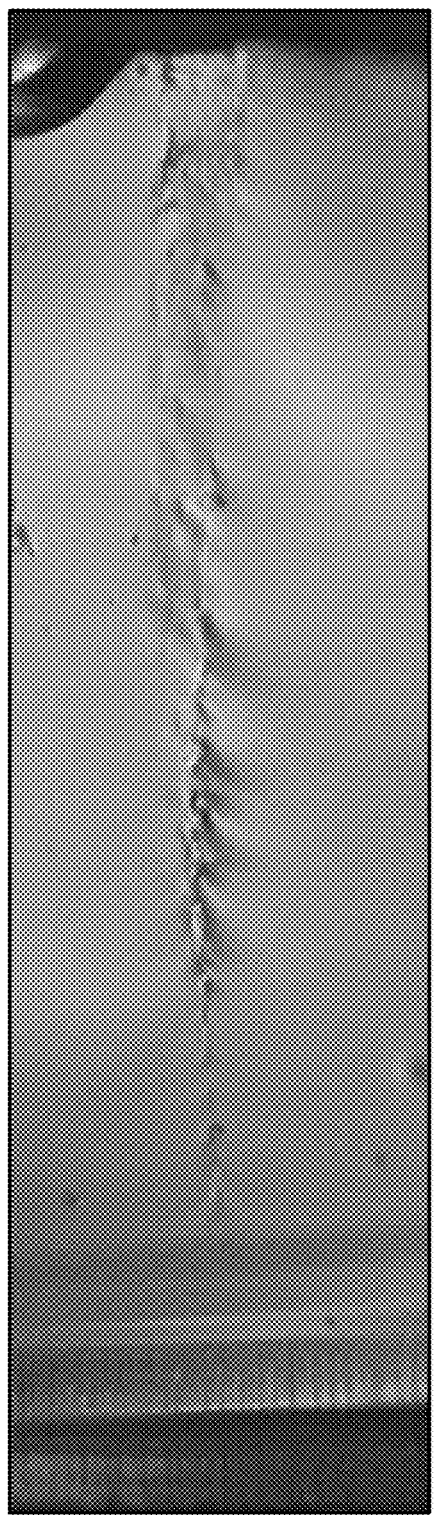
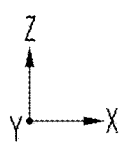
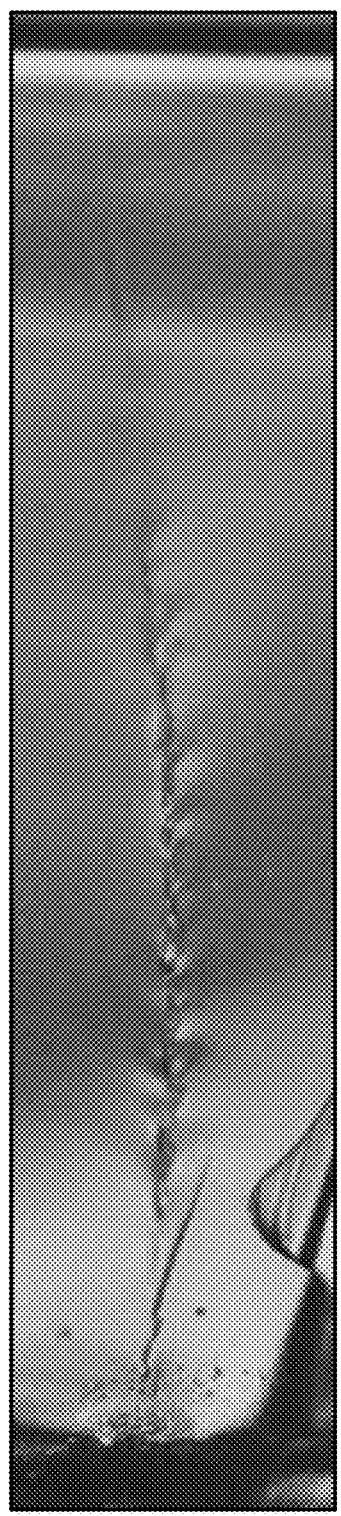
FIG. 9A  FIG. 9B

LASER FORMING NON-SQUARE EDGES IN TRANSPARENT WORKPIECES USING LOW INTENSITY AIRY BEAMS

This application claims the benefit of priority to U.S. Provisional Patent Application Ser. No. 63/077,195 filed on Sep. 11, 2020, the content of which is relied upon and incorporated herein by reference in its entirety.

BACKGROUND

Field

The present disclosure relates to glass processing, and in particular relates to systems and methods for processing glass substrates using Airy beams.

Technical Background

Glass processing, including glass cutting (cleaving) and edge finishing, is important in the formation of glass articles such as display glasses, glass panels and cover glasses. In particular, the square edges of glass sheets are prone to breakage and can be processed to have bevels or to be rounded to minimize the chance of breakage. This processing can be accomplished using mechanical means, such as mechanical grinding. Likewise, glass substrates need to be cleaved to have select dimensions and shapes. This processing can also be accomplished using mechanical means, such as a using diamond-blade saw. Unfortunately, mechanical processing of glass substrates is complex and generates glass dust and glass particles, which must be removed.

As an alternative, the cleaving and edge processing operations can be performed using conventional laser processing rather than mechanical process. However, conventional laser processing utilizes laser beams that travel in a straight line in free space and so are difficult to use when a rounded outer edge or like edge shaping is desired.

SUMMARY

According to a first aspect of the present disclosure, a method for processing a transparent workpiece includes directing a laser beam output by a beam source onto a phase-adjustment device such that the laser beam downstream the phase-adjustment device is an Airy beam and directing the Airy beam onto a surface of the transparent workpiece, wherein the Airy beam forms an Airy beam focal region in the transparent workpiece, the Airy beam of the Airy beam focal region having a maximum intensity of 100 TW/cm$^2$ or less, the Airy beam of the Airy beam focal region inducing absorption in the transparent workpiece, the induced absorption producing a curved defect in the transparent workpiece.

A second aspect of the present disclosure includes the method of the first aspect, wherein the Airy beam of the Airy beam focal region includes a main lobe and a plurality of side lobes and at least 50% of the energy of the Airy beam focal region is disposed in the main lobe.

A third aspect of the present disclosure includes the method of the second aspect, wherein the plurality of side lobes of the Airy beam focal region each have an intensity that is below a minimum intensity threshold.

A fourth aspect of the present disclosure includes the method of any of the previous aspects, wherein the maximum intensity of the Airy beam of the Airy beam focal region is 75 TW/cm$^2$ or less.

A fifth aspect of the present disclosure includes the method of any of the previous aspects, wherein the maximum intensity of the Airy beam of the Airy beam focal region is 25 TW/cm$^2$ or less.

A sixth aspect of the present disclosure includes the method of any of the previous aspects, wherein the maximum intensity of the Airy beam focal region is from 0.7 TW/cm$^2$ to 100 TW/cm$^2$.

A seventh aspect of the present disclosure includes the method of any of the previous aspects, wherein the phase-adjustment device includes a phase plate having a cubic phase modulation.

A eighth aspect of the present disclosure includes the method of any of the previous aspects, further including translating at least one of the transparent workpiece and the Airy beam relative to each other along a contour line to form a contour having a plurality of curved defects.

An ninth aspect of the present disclosure includes the method of the seventh aspect, wherein a spacing between adjacent curved defects of the plurality of curved defects is 35 μm or less.

A tenth aspect of the present disclosure includes the method of the seventh aspect or the eighth aspect, further including applying a stress to the contour to separate the transparent workpiece along the contour, thereby forming a non-square edge on the transparent workpiece.

An eleventh aspect of the present disclosure includes the method of any of the previous aspects, wherein the transparent workpiece comprises borosilicate glass, soda-lime glass, aluminosilicate glass, alkali aluminosilicate glass, alkaline earth aluminosilicate glass, alkaline earth boro-aluminosilicate glass, fused silica, sapphire, silicon, or gallium arsenide.

According to a twelfth aspect of the present disclosure, a method for processing a transparent workpiece includes directing a laser beam output by a beam source onto a phase-adjustment device such that the laser beam downstream the phase-adjustment device is an Airy beam, wherein the laser beam projects a beam spot on the phase-adjustment device having an energy distribution in which 20% or less of a total energy of the beam spot has a fluence less than 80% of a maximum fluence of the beam spot and directing the Airy beam onto a surface of the transparent workpiece, wherein the Airy beam forms an Airy beam focal region in the transparent workpiece, the Airy beam of the Airy beam focal region having a maximum intensity of from 0.125 TW/cm$^2$ to 50 TW/cm$^2$, the Airy beam of the Airy beam focal region inducing absorption in the transparent workpiece, the induced absorption producing a curved defect in the transparent workpiece.

A thirteenth aspect of the present disclosure includes the method of the twelfth aspect, wherein the maximum intensity of the Airy beam of the Airy beam focal region is from 0.7 TW/cm$^2$ to 35 TW/cm$^2$.

A fourteenth aspect of the present disclosure includes the method of the twelfth aspect or the thirteenth aspect, wherein the maximum intensity of the Airy beam of the Airy beam focal region is from 0.7 TW/cm$^2$ to 15 TW/cm$^2$.

A fifteenth aspect of the present disclosure includes the method of any of the twelfth aspect through the fourteenth aspect, wherein the laser beam traverses a diffractive optical element before irradiating the phase-adjustment device and the diffractive optical element modifies the energy distribution of the laser beam.

A sixteenth aspect of the present disclosure includes the method of any of the twelfth aspect through the fifteenth aspect, wherein 10% or less of the total energy of the beam spot has less than 80% of the maximum fluence of the beam spot.

A seventeenth aspect of the present disclosure includes the method of any of the twelfth aspect through the sixteenth aspect, wherein 5% or less of the total energy of the beam spot has less than 90% of the maximum fluence of the beam spot.

An eighteenth aspect of the present disclosure includes the method of any of the twelfth aspect through the seventeenth aspect, wherein the phase-adjustment device is a phase plate having a cubic phase modulation.

A nineteenth aspect of the present disclosure includes the method of any of the twelfth aspect through the eighteenth aspect, further including translating at least one of the transparent workpiece and the Airy beam relative to each other along a contour line to form a contour having a plurality of curved defects and applying a stress to the contour to separate the transparent workpiece along the contour, thereby forming a non-square edge on the transparent workpiece.

According to a twentieth aspect of the present disclosure, a method for processing a transparent workpiece includes directing a pulsed laser beam output by a beam source onto a phase-adjustment device such that the pulsed laser beam downstream the phase-adjustment device is a pulsed Airy beam, wherein the pulsed laser beam includes pulse bursts having 2 sub-pulses per pulse burst or more and directing the pulsed Airy beam onto a surface of the transparent workpiece, wherein the pulsed Airy beam forms a pulsed Airy beam focal region in the transparent workpiece, the pulsed Airy beam of the pulsed Airy beam focal region having a maximum intensity of from 0.125 $TW/cm^2$ to 50 $TW/cm^2$, the pulsed Airy beam of the pulsed Airy beam focal region inducing absorption in the transparent workpiece, the induced absorption producing a curved defect in the transparent workpiece.

A twenty-first aspect of the present disclosure includes the method of the twentieth aspect, wherein the maximum intensity of the pulsed Airy beam of the pulsed Airy beam focal region is from 0.7 $TW/cm^2$ to 35 $TW/cm^2$.

A twenty-second aspect of the present disclosure includes the method of the twentieth aspect or the twenty-first aspect, wherein the maximum intensity of the pulsed Airy beam of the pulsed Airy beam focal region is from 0.7 $TW/cm^2$ to 15 $TW/cm^2$.

A twenty-third aspect of the present disclosure includes the method of any of the twentieth aspect through the twenty-second aspect, wherein each pulse burst of the pulsed laser beam includes from 2 sub-pulses to 12 sub-pulses.

A twenty-fourth aspect of the present disclosure includes the method of any of the twentieth aspect through the twenty-fourth aspect, wherein each pulse burst of pulsed laser beam includes a burst duration of from 10 ps to 5 ns.

A twenty-fifth aspect of the present disclosure includes the method of any of the twentieth aspect through the twenty-third aspect, wherein the phase-adjustment device includes a phase plate having a cubic phase modulation.

A twenty-sixth aspect of the present disclosure includes the method of any of the twentieth aspect through the twenty-fifth aspect, further including translating at least one of the transparent workpiece and the pulsed Airy beam relative to each other along a contour line to form a contour having a plurality of curved defects and applying a stress to the contour to separate the transparent workpiece along the contour, thereby forming a non-square edge on the transparent workpiece.

Additional features and advantages of the processes and systems described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 9A is a grayscale image of a curved defect formed with an Airy beam focal region using the optical assembly of FIG. 1, according to one or more embodiments shown and described herein;

FIG. 9B is a grayscale image of a curved defect formed with an Airy beam focal region using the optical assembly of FIG. 8A having the same intensity of the Airy beam focal region of FIG. 9A, according to one or more embodiments shown and described herein;

DETAILED DESCRIPTION

Figure 1A:
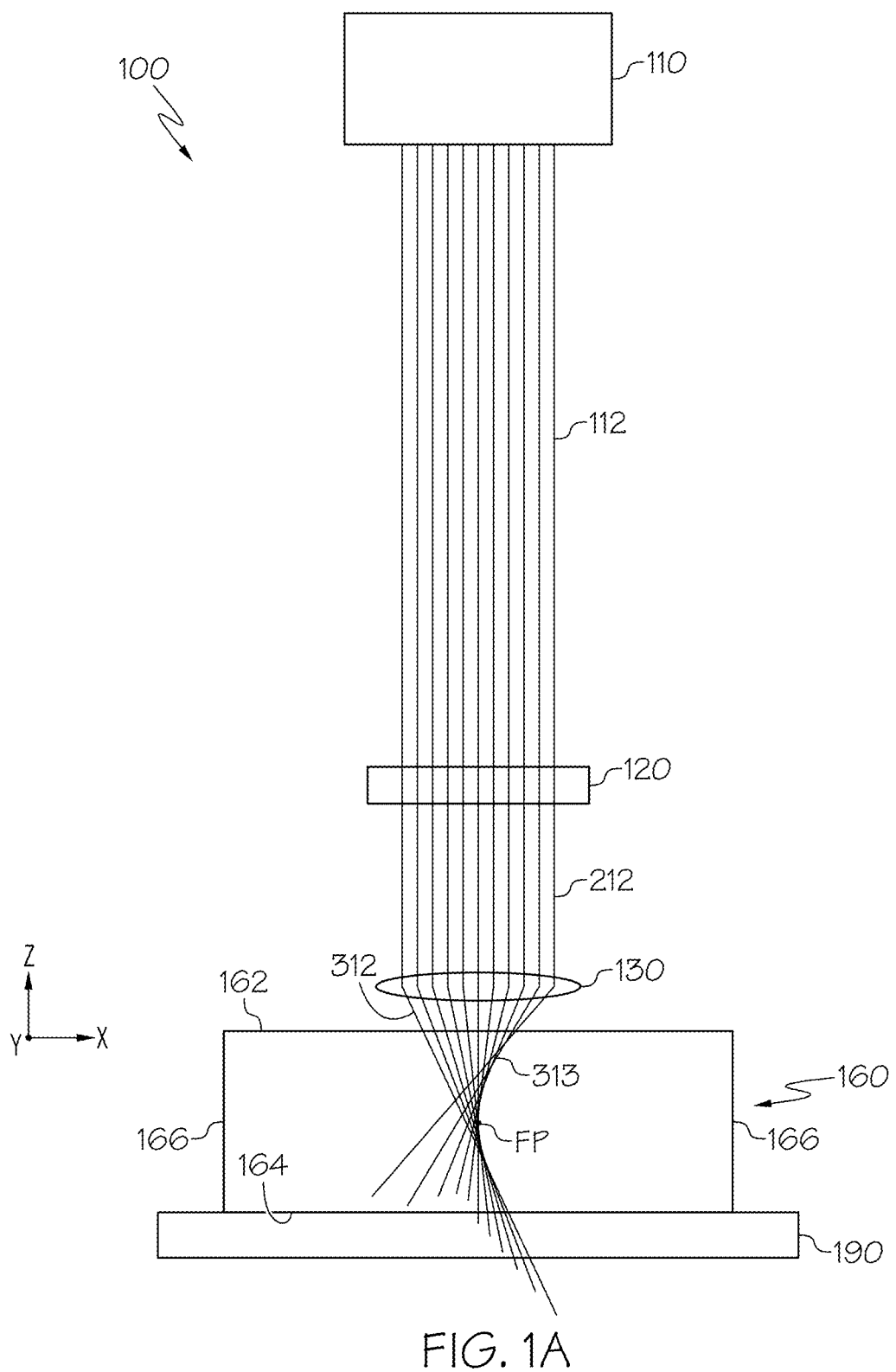
FIG. 1A schematically depicts an example optical system that includes a phase-adjustment device for forming an Airy beam and processing a transparent workpiece using the Airy beam, according to one or more embodiments described herein.

Separating and edge finishing play a key role in many products formed from transparent workpieces, for example, glass products such as display glasses and cover glasses. In particular, transparent workpieces having square edges are prone to breakage propagating from these edges. Thus, square edges are often processed to form non-square edges, such as rounded edges, beveled edges, or the like, to minimize the chance of breakage. Currently, non-square edges are often formed using mechanical means, such as mechanical grinding and polishing. However, these mechanical processes generate glass dust and particles, which must be cleaned by additional process steps involving washing or chemical treatments. Thus, it is desirable to replace conventional edge finishing processes with a particle free and high throughput process of forming non-square edges.

The optical systems and methods described herein use an Airy beam having self-bending characteristics to provide a high throughput process of forming non-square edges within minimal particle generation and unwanted damage. In particular, the optical systems and methods described herein use low intensity Airy beams to form curved defects in a transparent workpiece to minimize unintended damage to the transparent workpiece and facilitate efficient separation with minimal roughness on the resultant non-square edges. Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

While not intending to be limited by theory, an "Airy beam" refers to a type of laser beam that comprises a curvature in free space due to the beam having a select phase. An Airy beam may be formed by directing a conventional Gaussian laser beam through a phase-adjustment device, such as a phase plate, which increases the depth of focus and changes the propagation trajectory of the beam. In some embodiments, the Airy beam may be referred to as a self-bending beam, an accelerating beam, a self-accelerating beam, or a non-diffracting beam. A cross-section of the Airy beam (i.e., a cross section orthogonal to the propagation trajectory of the beam) comprises multiple lobes, including a main lobe a plurality of sidelobes. The main lobe is the largest lobe and is the lobe with the highest energy and highest intensity. When the Airy beam is used during a transparent workpiece separation process, a non-square edge can be formed due to the curvature of the Airy beam and the energy in the main lobe is used to modify a transparent workpiece (e.g., ablate, form defects, or otherwise alter to facilitate separation of the transparent workpiece).

As used herein, "laser processing" comprises directing a laser beam onto and/or into a transparent workpiece. In some embodiments, laser processing further comprises translating the laser beam relative to the transparent workpiece, for example, along a contour line or other pathway. Examples of laser processing include using an Airy beam to form a contour comprising a series of curved defects that extend into the transparent workpiece. The transparent workpiece may be separated along the contour comprising the series of curved defect by additional laser processes, such as by using an infrared laser beam.

As used herein, "upstream" and "downstream" refer to the relative position of two locations or components along a beam pathway with respect to a beam source. For example, a first component is upstream from a second component if the first component is closer to the beam source along the path traversed by the laser beam than the second component.

As used herein, "contour line," corresponds to the set of intersection points of the laser beam with the incident surface of a transparent workpiece resulting from relative motion of the laser beam and the transparent workpiece. A contour line can be a linear, angled, polygonal or curved in shape. A contour line can be closed (i.e. defining an enclosed region on the surface of the substrate) or open (i.e. not defining an enclosed region on the surface of the substrate). The contour line represents a boundary along which separation of the substrate into two or more parts is facilitated.

As used herein, "contour," refers to a set of defects (e.g., curved defects) in the transparent workpiece formed by a laser beam through relative motion of a laser beam and the substrate along a contour line. The defects are spaced apart along the contour line and are wholly contained within the interior of the transparent workpiece or extend through one or more surfaces into the interior of the transparent workpiece. Defects may also extend through the entire thickness of the transparent workpiece. Separation of the transparent workpiece occurs by connecting defects, such as, for example, through propagation of a crack.

As used herein, a "defect" refers to a region of a transparent workpiece that has been modified by a laser beam. As the defects described herein are formed by an Airy beam having self-bending characteristics, the defects are curved in correspondence to the curve of the Airy beam and are thus referred to hereinafter as "curved defects." Curved defects include regions of a transparent workpiece having a modified refractive index relative to surrounding unmodified regions of the transparent workpiece. Curved defects may include structurally modified regions such as void spaces, cracks, scratches, flaws, holes, perforations, densifications, or other deformities in the transparent workpiece produced by an Airy beam. A curved defect is formed through interaction of an Airy beam (in particular, a main lobe of an Airy beam) with the transparent workpiece. As described more fully below, the Airy beam is produced by a pulsed laser. A curved defect at a particular location along the contour line is formed from a main lobe of an Airy beam produced by a single laser pulse at the particular location, a pulse burst of sub-pulses at the particular location, multiple laser pulses at the particular location, or multiple pulse bursts of sub-pulses at the particular location. Relative motion of the laser beam and transparent workpiece along the contour line results in multiple curved defects that form a contour.

The phrase "transparent workpiece," as used herein, means a workpiece formed from glass, glass-ceramic or other material which is transparent, where the term "transparent," as used herein, means that the material has a linear optical absorption of less than 20% per mm of material depth, such as less than 10% per mm of material depth for the specified pulsed laser wavelength, or such as less than 1% per mm of material depth for the specified pulsed laser wavelength. Unless otherwise specified, the material has a linear optical absorption of less than about 20% per mm of material depth. The transparent workpiece may have a depth (e.g., thickness) of from about 50 microns (μm) to about 10 mm (such as from about 100 μm to about 5 mm, or from about 0.5 mm to about 3 mm). Transparent workpieces may comprise glass workpieces formed from glass compositions, such as borosilicate glass, soda-lime glass, aluminosilicate glass, alkali aluminosilicate, alkaline earth aluminosilicate glass, alkaline earth boro-aluminosilicate glass, fused silica, or crystalline materials such as sapphire, silicon, gallium arsenide, or combinations thereof. In some embodiments, the transparent workpiece may be strengthened via thermal tempering before or after laser processing the transparent workpiece. In some embodiments, the glass may be ion-exchangeable, such that the glass composition can undergo ion-exchange for glass strengthening before or after laser processing the transparent workpiece. For example, the transparent workpiece may comprise ion exchanged and ion exchangeable glass, such as Corning Gorilla® Glass available from Corning Incorporated of Corning, NY (e.g., code 2318, code 2319, and code 2320). Further, these ion-exchanged glasses may have coefficients of thermal expansion (CTE) of from about 6 ppm/° C. to about 10 ppm/° C. Other example transparent workpieces may comprise EAGLE XG® and CORNING LOTUS™ available from Corning Incorporated of Corning, NY Moreover, the transparent workpiece may comprise other components, which are transparent to the wavelength of the laser, for example, glass ceramics or crystals such as sapphire or zinc selenide.

In an ion exchange process, ions in a surface layer of the transparent workpiece are replaced by larger ions having the same valence or oxidation state, for example, by partially or fully submerging the transparent workpiece in an ion exchange bath. Replacing smaller ions with larger ions causes a layer of compressive stress to extend from one or more surfaces of the transparent workpiece to a certain depth within the transparent workpiece, referred to as the depth of layer. The compressive stresses are balanced by a layer of tensile stresses (referred to as central tension) such that the net stress in the glass sheet is zero. The formation of compressive stresses at the surface of the glass sheet makes the glass strong and resistant to mechanical damage and, as such, mitigates catastrophic failure of the glass sheet for flaws, which do not extend through the depth of layer. In some embodiments, smaller sodium ions in the surface layer of the transparent workpiece are exchanged with larger potassium ions. In some embodiments, the ions in the surface layer and the larger ions are monovalent alkali metal cations, such as Li+(when present in the glass), Na+, K+, Rb+, and Cs+. Alternatively, monovalent cations in the surface layer may be replaced with monovalent cations other than alkali metal cations, such as Ag+, Tl+, Cu+, or the like.

Referring now to FIG. 1A, an optical system 100 for laser processing a transparent workpiece 160 is depicted. The transparent workpiece 160 comprises a first surface 162, a second surface 164 opposite the first surface 162, and one or more edges 166. As shown in FIG. 1A, the edges 166 are square edges. The optical system 100 is configured to transform a laser beam 112 (e.g., a Gaussian laser beam) into a phase-adjusted laser beam 212 which, when focused using a focusing lens 130, forms an Airy beam 312 that focuses into an Airy beam focal region 313. The Airy beam 312 may be used to form a series of curved defects 172 (FIG. 2A) in the transparent workpiece 160 along which the transparent workpiece 160 may be separated to form one or more non-square edges 168 (FIG. 2B). Without intending to be limited by theory, the Airy beam focal region 313 is materially independent such that the Airy beam focal region 313 may form within the transparent workpiece 160 and/or outside of the transparent workpiece 160, depending on the relative positioning of the optical system 100 and the transparent workpiece 160. Indeed, in the schematic depiction of FIG. 1A, the Airy beam focal region 313 extends through the thickness of the workpiece 160 and extends just beyond the first surface 162 and the second surface 164.

The optical system 100 comprises a beam source 110 that emits the laser beam 112, which may comprise a Gaussian laser beam. While not intending to be limited by theory, Gaussian beams decay monotonically and the diameter of a Gaussian beam is typically defined by a $1/e^2$ drop in intensity (that is, the beam diameter is twice the distance between the radial position corresponding to peak intensity and the radial position at which the intensity is $1/e^2$ times the maximum intensity). The diameter of a Gaussian beam varies in the direction of propagation. The beam waist of a Gaussian beam corresponds to the minimum diameter of the Gaussian beam. In some embodiments, the laser beam 112 emitted by the beam source 110 is pulsed and comprises short light pulses (e.g., in the range from femtoseconds to picoseconds) or pulse bursts having a closely spaced series of sub-pulses.

In some embodiments, the beam source 110 may output a laser beam 112 comprising a wavelength of, for example, 1064 nm, 1030 nm, 532 nm, 530 nm, 355 nm, 343 nm, or 266 nm, or 215 nm. Further, the laser beam 112 that is transformed into the Airy beam 312 and used to form curved defects 172 in the transparent workpiece 160 may be well suited for materials that are transparent to the selected laser wavelength. Suitable laser wavelengths for forming curved defects 172 are wavelengths at which the combined losses of linear absorption and scattering by the transparent workpiece 160 are sufficiently low.

Referring still to FIG. 1A, the optical system 100 further comprises a phase-adjustment device 120 positioned downstream the beam source 110 such that the laser beam 112 (e.g., a pulsed laser beam) emitted by the beam source 110 impinges (e.g., traverses or reflects from) the phase-adjustment device 120 and thereafter traverses the focusing lens 130. The phase-adjustment device 120 is configured to adjust a phase of the laser beam 112 to form a phase-adjusted laser beam 212. In particular, the phase-adjustment device 120 applies a cubic phase modulation to the laser beam 112 to form a phase-adjusted laser beam 212 downstream from the phase-adjustment device 120. The cubic phase modulation applied to form the phase-adjusted laser beam 212 is such that, when the phase-adjusted laser beam 212 is focused by the focusing lens 130, the phase-adjusted laser beam 212 forms into an Airy beam 312 which focuses into an Airy beam focal region 313 near the focal point FP of the focusing lens 130.

Figure 1B:
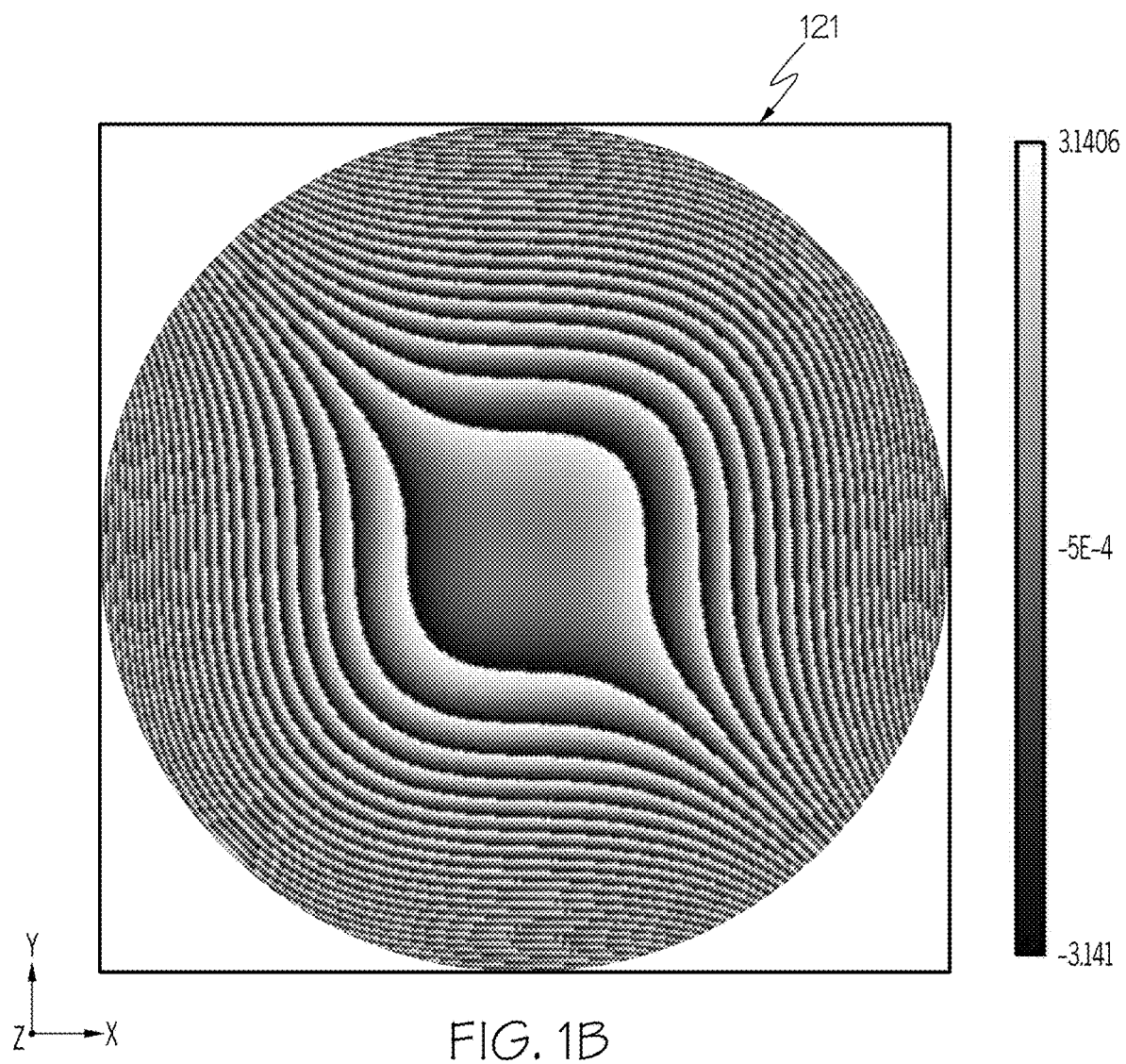
FIG. 1B is a phase contour map of the phase-adjustment device of FIG. 1A, according to one or more embodiments described herein.

Referring now to FIGS. 1A and 1B, the phase function of the Airy beam can be expressed as $\varphi=(\alpha k)^3 ((x+y)^3+(x-y)^3)$, which may also be written as $\theta=(\alpha k)^3(x^3+y^3)$, where $\alpha$ is the frequency of phase modulation, k is the wave vector of the laser beam 112, and x and y are the spatial coordinates of the phase function. In particular, FIG. 1B shows a cubic phase mask 121 used by the phase-adjustment device 120 to ultimately form the Airy beam 312 downstream the focusing lens 130. In some embodiments, the phase-adjustment device 120 comprises a diffractive optical element, such as a phase plate having a cubic phase modulation (which may be an Airy phase plate) pre-made on an optical surface and in other embodiments; the phase-adjustment device 120 comprises a spatial light modulator consisting of a large number of pixels with adjustable refractive indices. In embodiments in which the phase-adjustment device 120 comprises a phase plate, the cubic phase mask 121 corresponds to the surface topography of the phase plate. Moreover, the phase-adjustment device 120 may be transmissive or reflective. For example, phase plate embodiments of the phase-adjustment device 120 may be transmissive and spatial light modulator embodiments of the phase-adjustment device 120 may be reflective.

Figure 1C:
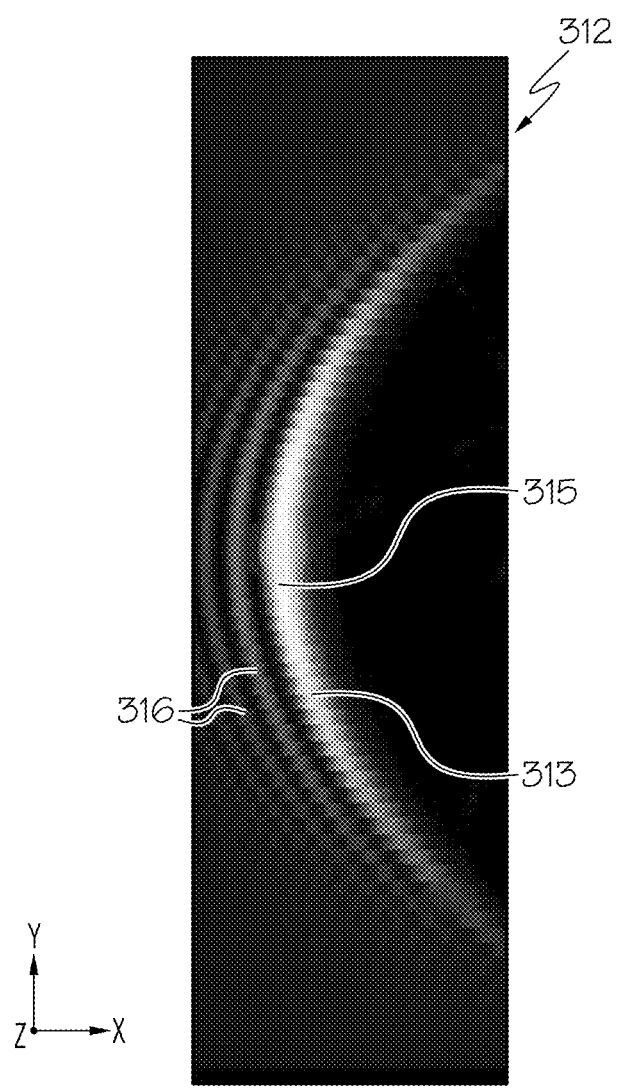
FIG. 1C is an Airy beam focal region formed using the optical system of FIG. 1A, according to one or more embodiments described herein.
Figure 1D:
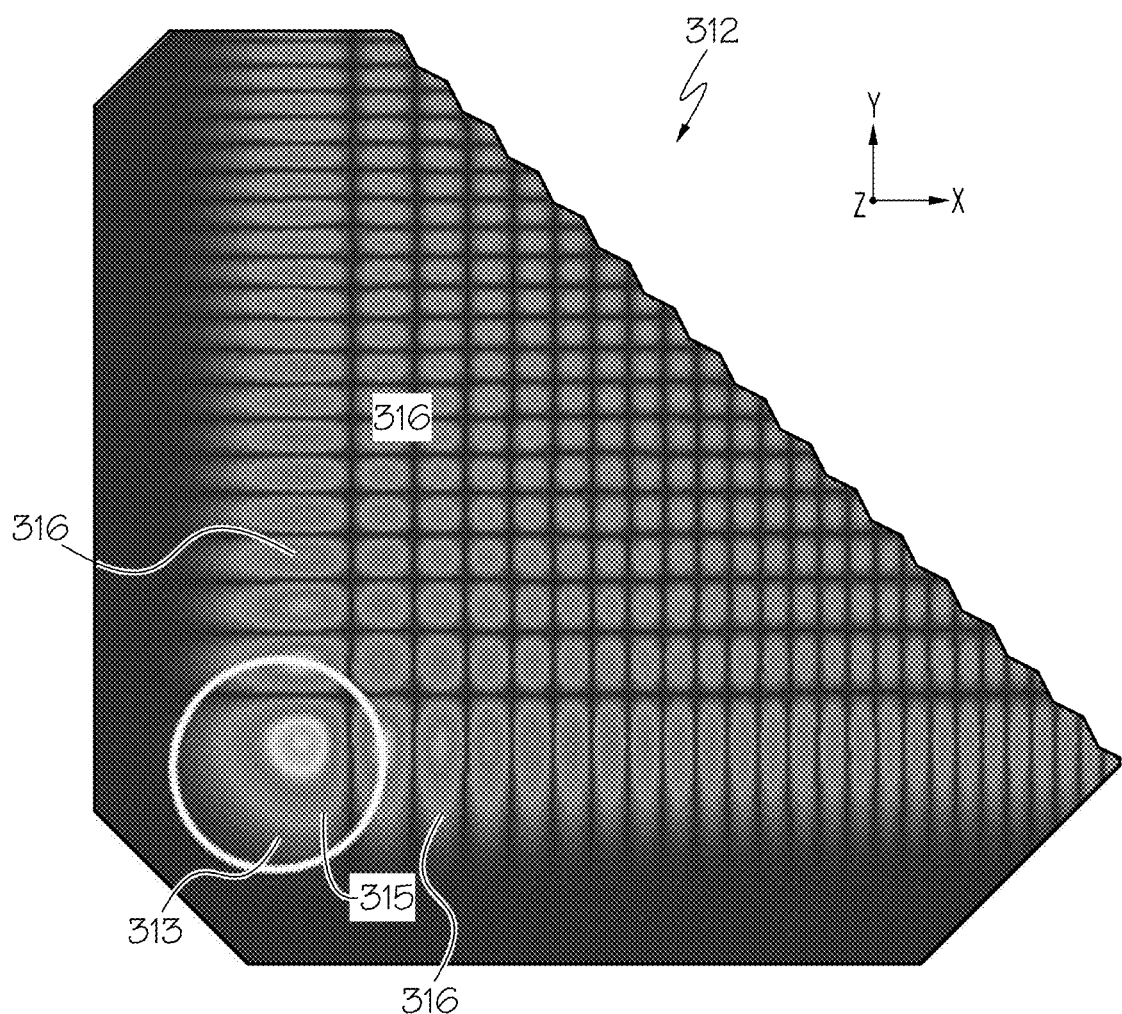
FIG. 1D is a beam cross section of the Airy beam focal region of FIG. 1C, according to one or more embodiments shown and described herein.

The Airy beam focal region 313 of the Airy beam 312 is shown in more detail in FIGS. 1C and 1D. Due to the cubic nature of the phase of the Airy beam 312, it exhibits a curved trajectory when focused by the focusing lens 130. Indeed, FIGS. 1A and 1C depict the curved beam path of the Airy beam focal region 313, which is the Airy beam 312 near the focal point FP of the focusing lens 130. The section of the Airy beam focal region 313 with the highest intensity is a main lobe 315 (see FIG. 1D), which corresponds with the curved portion shown in FIGS. 1A. and 1C. In addition, the Airy beam focal region 313 further comprises a plurality of side lobes 316, each comprising a lower intensity than the main lobe 315. The side lobes 316 of FIGS. 1C and 1D correspond with the crossing rays offset from the curved portion of the Airy beam focal region 313 in FIG. 1A.

Figure 2A:
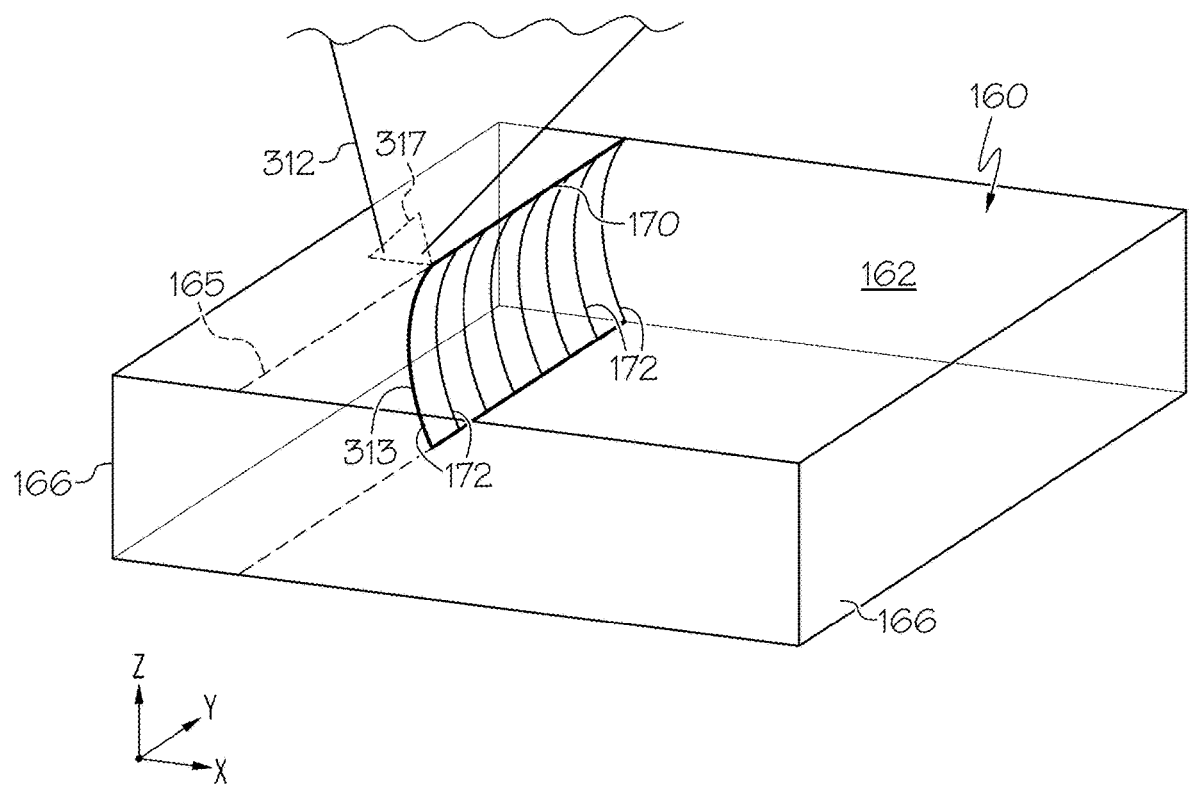
FIG. 2A schematically depicts the formation of a contour of curved defects in a transparent workpiece, according to one or more embodiments described herein.
Figure 2B:
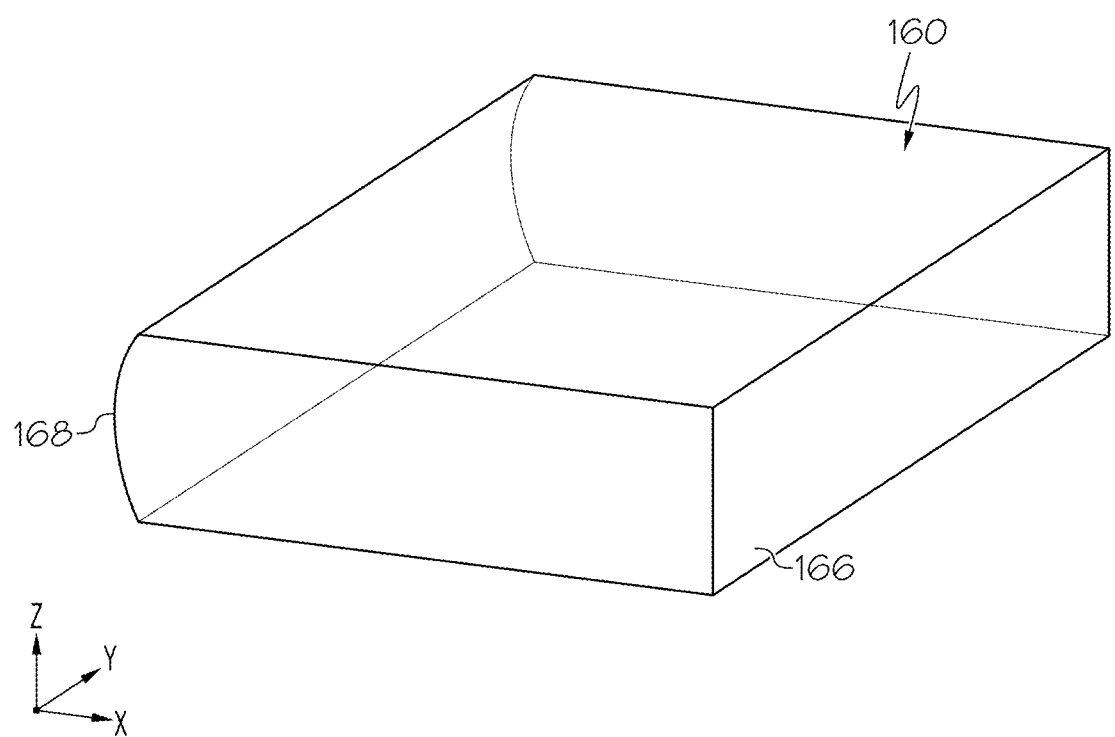
FIG. 2B schematically depicts the transparent workpiece of FIG. 2A having a non-square edge formed after separation of the contour of curved defects, according to one or more embodiments shown and described herein.

Referring now to FIGS. 2A and 2B, when the Airy beam 312 is directed into the transparent workpiece 160, the Airy beam focal region 313 induces absorption of laser energy in the transparent workpiece 160, forming a curved defect 172. In operation, the curved defects 172 of the contour 170 are produced by interaction of the transparent workpiece 160 with the Airy beam focal region 313. In particular, the main lobe 315 of the Airy beam focal region 313 may create multi-photon absorption (MPA) in the transparent workpiece 160. MPA is the simultaneous absorption of two or more photons of identical or different frequencies that excites a molecule from one state (usually the ground state) to a higher energy electronic state (i.e., ionization). The energy difference between the involved lower and upper states of the molecule is equal to the sum of the energies of the involved photons. MPA, also called induced absorption, can be a second-order or third-order process (or higher order), for example, that is several orders of magnitude weaker than linear absorption. It differs from linear absorption in that the strength of second-order induced absorption may be proportional to the square of the light intensity, for example, and thus it is a nonlinear optical process. Without intending to be limited by theory, generating an induced absorption in the transparent workpiece 160 deposits enough energy to break chemical bonds in the transparent workpiece 160 at spaced locations along the contour line 165 to form the curved defects 172.

Referring still to FIGS. 2A and 2B, the contour 170 comprising a series of curved defects 172 may be formed in the transparent workpiece 160 by irradiating a contour line 165 with the Airy beam 312 and translating at least one of the Airy beam 312 and the transparent workpiece 160 relative to each other along the contour line 165 to form the curved defects 172 of the contour 170. The Airy beam 312 may project an Airy beam spot 317 on the first surface 162 of the transparent workpiece 160 corresponding with the cross sectional shape of the Airy beam 312 depicted in FIG. 1D. According to one or more embodiments, the Airy beam 312 may be translated across the transparent workpiece 160 by motion of the transparent workpiece 160 (e.g., motion of a translation stage 190 coupled to the transparent workpiece 160), motion of the Airy beam 312, or motion of both the transparent workpiece 160 and the Airy beam 312. By translating at least one of the Airy beam 312 relative to the transparent workpiece 160, the plurality of curved defects 172 may be formed in the transparent workpiece 160.

While the contour 170 depicted in FIG. 2A is linear, it should be understood that the contour 170 may be non-linear, for example, curved. Further, in some embodiments, the contour 170 may be a closed contour, such as a circle, rectangles, ellipses, squares, hexagons, ovals, regular geometric shapes, irregular shapes, polygonal shapes, arbitrary shapes, and the like. Furthermore, the curved defects 172 may generally be spaced apart from one another by a distance along the contour 170 of from 0.1 µm to 500 µm, such as, 1 µm to 200 µm, 2 µm to 100 µm, or 5 µm to 20 µm, 0.1 µm to 50 µm, 5 µm to 15 µm, 5 µm to 12 µm, 7 µm to 15 µm, 8 µm to 15 µm, or 8 µm to 12 µm, such as 50 µm or less, 45 µm or less, 40 µm or less, 35 µm or less, 30 µm or less, 25 µm or less, 20 µm or less, 15 µm or less, 10 µm or less, such as 100 µm, 75 µm, 50 µm, 40 µm, 30 µm, 25 µm, 10 µm, 5 µm, or any range having any two of these values as endpoints.

Referring still to FIGS. 2A and 2B, after forming the contour 170 of curved defects 172, the transparent workpiece 160 may be further acted upon in a subsequent separating step to induce separation of the transparent workpiece 160 along the contour 170. As shown in FIG. 2B, separation of the transparent workpiece 160 forms one or more non-square edges 168 in the transparent workpiece 160. The subsequent separating step may include using mechanical force, thermal stress induced force, or a chemical etchant to propagate a crack along the contour 170. The thermal source, such as an infrared laser beam, may be used to create thermal stress and thereby separate the transparent workpiece 160 along the contour 170. Separating the transparent workpiece 160 may include directing an infrared laser beam at the contour 170 to induce thermal stress to propagate a crack along the contour 170. In some embodiments, the infrared laser beam may be used to initiate separation and then the separation may be finished mechanically. Example infrared lasers include a carbon dioxide laser (a "$CO_2$ laser"), a carbon monoxide laser (a "CO laser"), a solid-state laser, a laser diode, or combinations thereof.

Without being bound by theory, the infrared laser is a controlled heat source that rapidly increases the temperature of the transparent workpiece 160 at or near the contour 170. This rapid heating may build compressive stress in the transparent workpiece 160 on or adjacent to the contour 170. Since the area of the heated glass surface is relatively small when compared to the overall surface area of the transparent workpiece 160, the heated area cools relatively rapidly. The resultant temperature gradient induces tensile stress in the transparent workpiece 160 sufficient to propagate a crack along the contour 170 and through the depth of the transparent workpiece 160, resulting in full separation of the transparent workpiece 160 along the contour 170. Without being bound by theory, it is believed that the tensile stress may be caused by expansion of the glass (i.e., changed density) in portions of the workpiece with higher local temperature.

Referring now to FIGS. 3A-6B, the effects of the maximum intensity of the Airy beam 312 used to form the curved defects 172 that facilitate the formation of one or more non-square edges 168 in the transparent workpiece 160 will now be explored. While not intending to be limited by theory, the maximum intensity of the Airy beam 312 is the maximum intensity of the main lobe 315 of the Airy beam 312. While still not intending to be limited by theory, the maximum intensity forms at the focal point FP of the focusing lens 130 and forms in the Airy beam focal region 313. FIGS. 3A-6D are grayscale images of example Airy beam focal regions 313A-313D (FIGS. 3A-6A) having differing maximum intensities and grayscale images of example curved defects 172A-172D (FIGS. 3B-6B) formed using each of the example Airy beam focal regions 313A-313D are shown. Each example curved defect 172A-172D is formed in CORNING GORILLA™ glass, available from Corning Incorporated of Corning, NY The Airy beam focal regions 313A-313D used to form curved defects 172A-172D are formed using a Gaussian beam with a $1/e^2$ diameter of 7 mm that is directed through an Airy phase plate with a cubic coefficient of $\alpha=1$ then focused into the transparent workpiece 160 using a 10 mm focal length objective.

Figures 3A, 3B:
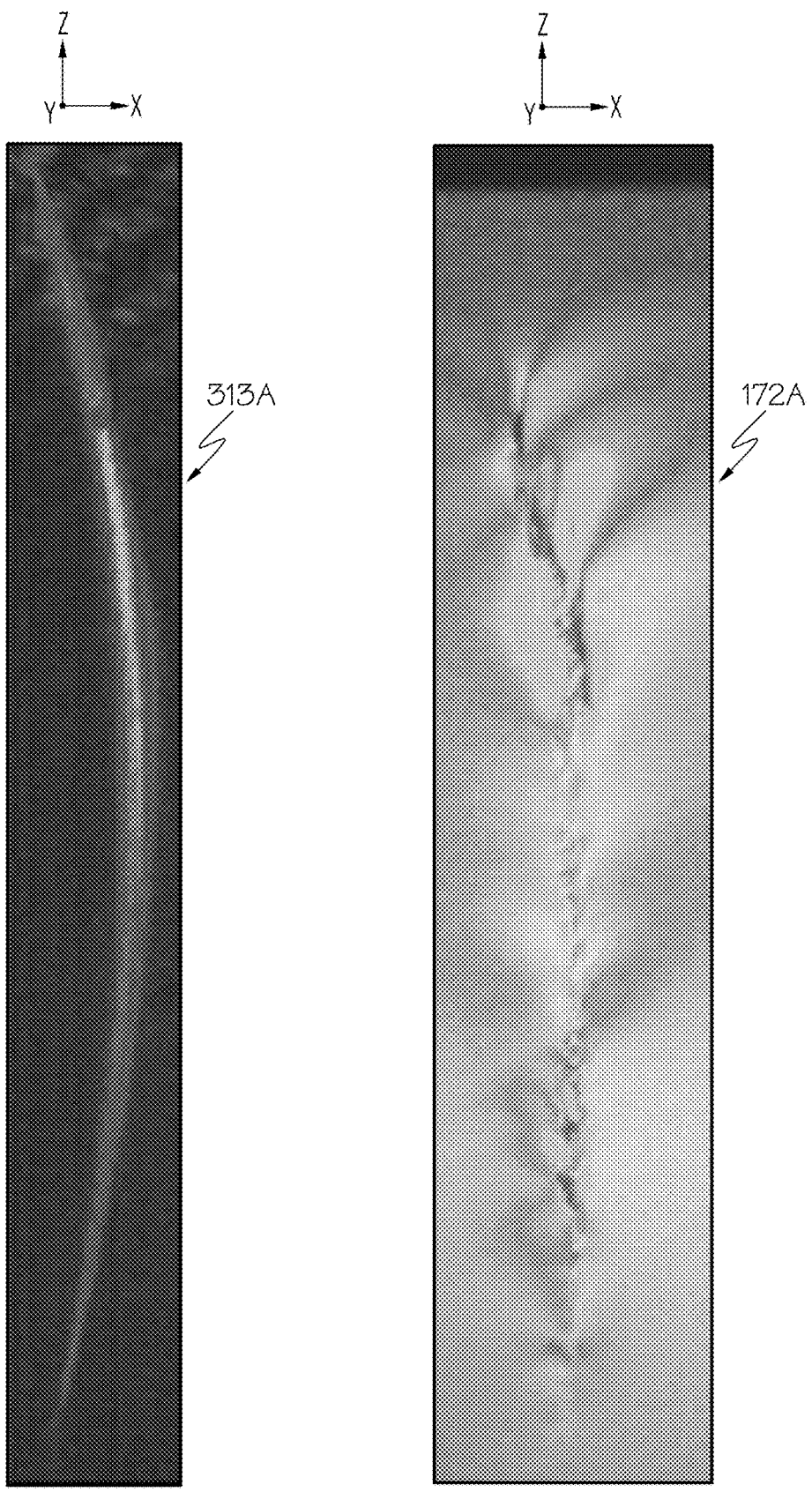
FIG. 3A is a grayscale image of an example Airy beam focal region, according to one or more embodiments shown and described herein.
FIG. 3B is a grayscale image of a curved defect formed with the Airy beam focal region of FIG. 3A, according to one or more embodiments shown and described herein.
Figure 4A:
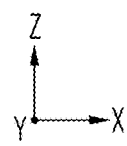
FIG. 4A is a grayscale image of another example Airy beam focal region, according to one or more embodiments shown and described herein.
Figure 4A:
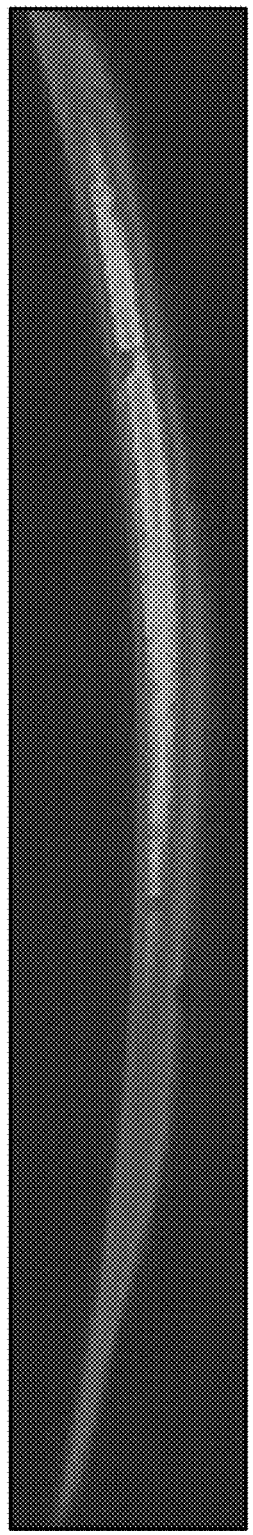
Figure 4B:
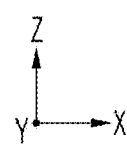
FIG. 4B is a grayscale image of a curved defect formed with the Airy beam focal region of FIG. 4A, according to one or more embodiments shown and described herein.
Figure 4B:
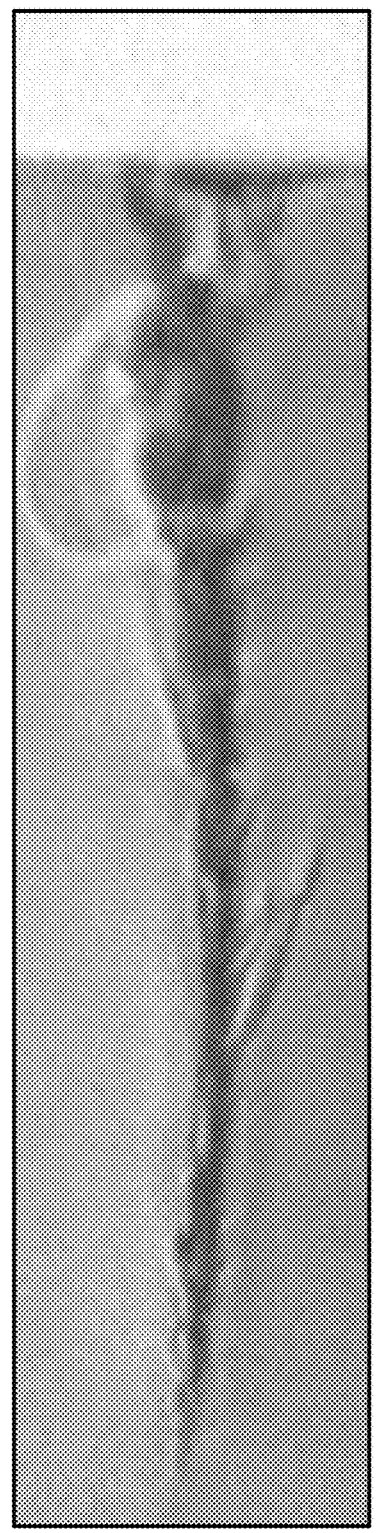
Figure 5A:
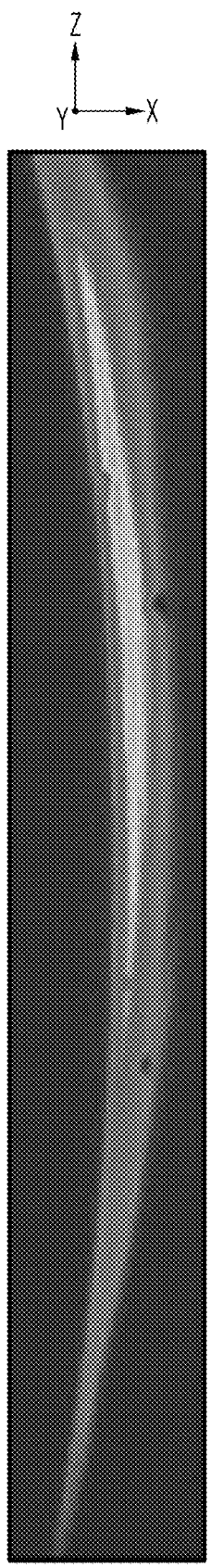
FIG. 5A is a grayscale image of another example Airy beam focal region, according to one or more embodiments shown and described herein.
Figure 5B:
FIG. 5B is a grayscale image of a curved defect formed with the Airy beam focal region of FIG. 5A, according to one or more embodiments shown and described herein.
Figure 6A:
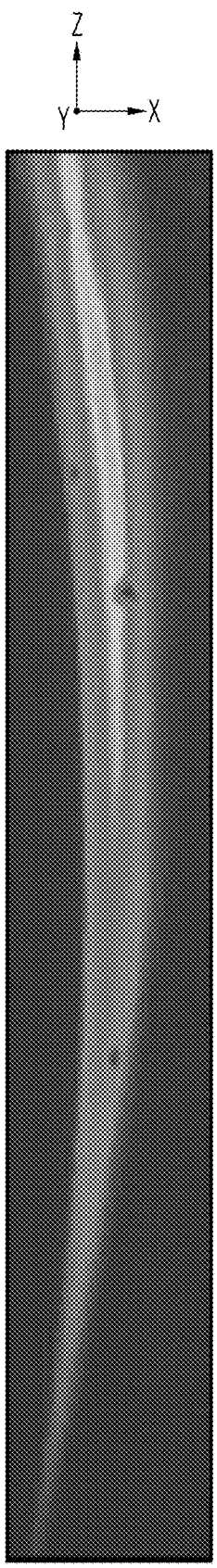
FIG. 6A is a grayscale image of another example Airy beam focal region, according to one or more embodiments shown and described herein.
Figure 6B:
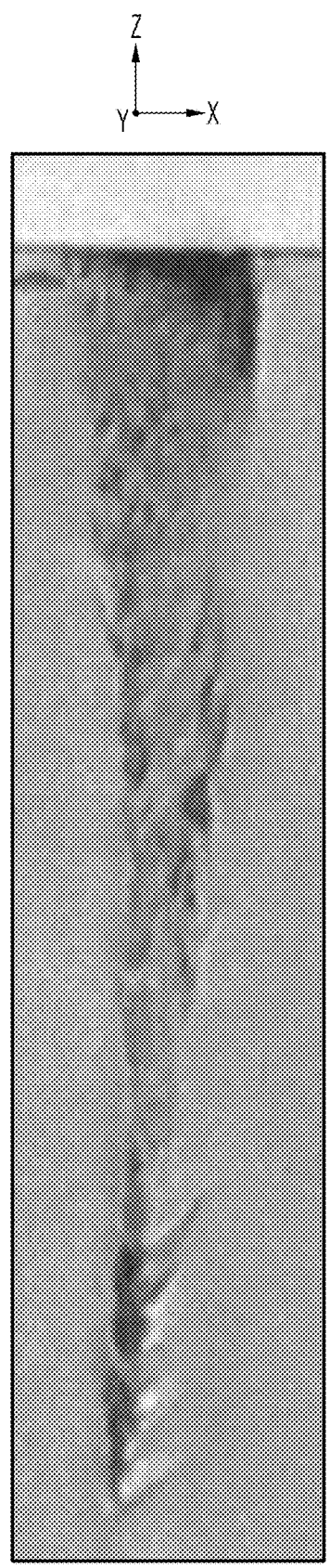
FIG. 6B is a grayscale image of a curved defect formed with the Airy beam focal region of FIG. 6A, according to one or more embodiments shown and described herein.

The Airy beam focal region 313A of FIG. 3A has a maximum intensity of 30 $TW/cm^2$, the Airy beam focal region 313B of FIG. 4A has a maximum intensity of 100 $TW/cm^2$, the Airy beam focal region 313C of FIG. 5A has a maximum intensity of 200 $TW/cm^2$, and the Airy beam focal region 313D of FIG. 6A has a maximum intensity of 600 $TW/cm^2$. As shown by FIGS. 3A-6B, as the maximum intensity of the Airy beam focal regions 313A-313D increase, the width of the corresponding curved defects 172A-172D increase and damage extending laterally into the transparent workpiece 160 from the curved defects 172A-172D also increases. Thus, FIGS. 3A-6D show the counterintuitive result that increasing the maximum intensity of the Airy beam focal region 313 beyond a maximum intensity threshold reduces the quality of the curved defects 172 formed in the transparent workpiece 160 and thereby reduces the quality (e.g. smoothness or strength) of the non-square edge 168 formed upon separation of the transparent workpiece 160 along the contour 170 of curved defects 172. Indeed, increasing the maximum intensity of the Airy beam focal region 313 above a maximum intensity threshold can increase incidental nonlinear effects and generate incidental damage in the transparent workpiece 160.

Without intending to be limited by theory, by limiting the maximum laser intensity of the Airy beam focal region 313, the effects of incidental nonlinear processes such as the Kerr effect and plasma defocusing can be reduced. These incidental nonlinear processes negatively affect the resultant curved defect 172 by disturbing the wavefront of the Airy beam focal region 313. One consequence of disturbing the wavefront of Airy beam 312 in Airy beam focal region 313 is a redistribution of laser energy away from the main lobe 315 and into the side lobes 316. An increase in the energy of side lobes 316 can lead to an increase in non-linear absorption by the side lobes 316, which has the effect of creating damage in the transparent workpiece 160 away from curved defect 172. If sufficient energy is transferred away from main lobe 315, the maximum intensity of main lobe 315 may be insufficient to induce absorption and form curved defect 172 or the distance of propagation of main lobe 315 into transparent workpiece 160 may be limited (e.g. less than the full thickness). It should be understood that some nonlinear effects (i.e., MPA) are relied upon to induce absorption and form the curved defects 172 and thus the intensity of the main lobe 315 needed to induce absorption and form the curved defects 172 should be balanced with incidental nonlinear absorption in the side lobes 316, and detrimental Kerr and plasma defocusing effects.

To limit nonlinear absorption in the side lobes 316, one may want to block the side lobes 316, such that only the main lobe 315 is directed into the transparent workpiece 160. However, the effects of this blocking would cause degradation of the Airy beam focal region 313 to such an extent that the curved defects 172 are not properly formed. While the main lobe 315 has the highest intensity, the lower intensity side lobes 316 store energy for perpetuation and sustainment of main lobe 315 as energy from main lobe 315 is extracted to form curved defect 172. An important feature of Airy beam 312 is "self-healing" characteristic; that is, if the main lobe 315 is blocked, attenuated, or interrupted, and the side lobes 316 are undisturbed, the main lobe 315 in the Airy beam focal region 313 can be restored some distance after the block, attenuation, or interruption through a transfer of energy from side lobes 316. If the side lobes 316 are blocked or disturbed, energy transfer from side lobes 316 to main lobe 315 cannot occur, main lobe 315 is not restored, and the Airy beam focal region 313 becomes unstable after a short distance in the direction of propagation. As a result, curved defects 172 are not created or, if created, are incomplete or irregular.

Instead, as shown in FIGS. 3A-6B, limiting the maximum intensity of the Airy beam focal region 313 below a maximum intensity threshold results in an Airy beam focal region 313 that propagates a long distance with more of its energy contained in the main lobe 315 without suffering beam quality degradation due to incidental nonlinear effects. This improves the quality of the curved defects 172 without excessively damaging the transparent workpiece 160. Moreover, because the low intensity Airy beams minimize beam quality degradation due to incidental nonlinear effects, these low intensity Airy beams may be used to laser process transparent workpieces at increasing depths, facilitating the formation of curved defects though the depths of a wide range of glass thicknesses. The formation of high quality curved defects 172 facilitates a high quality non-square edge 168 after separation and minimizes lateral damage into the separated transparent workpiece 160.

Furthermore, reducing the maximum intensity of the Airy beam focal region 313 increases the relative intensity of the main lobe 315 compared to the side lobes 316. As the induced absorption that forms the curved defects 172 is preferentially generated by the main lobe 315 and the side lobes 316 primarily generate incidental damage to the transparent workpiece 160, this reduction in maximum intensity increases the efficiency of laser processing and the quality of curved defects 172. In the embodiments described herein, the maximum intensity of the Airy beam focal region 313 is maintained at a level such that at least 50% of the energy of the Airy beam focal region 313 is disposed in the main lobe 315.

Figure 7A:
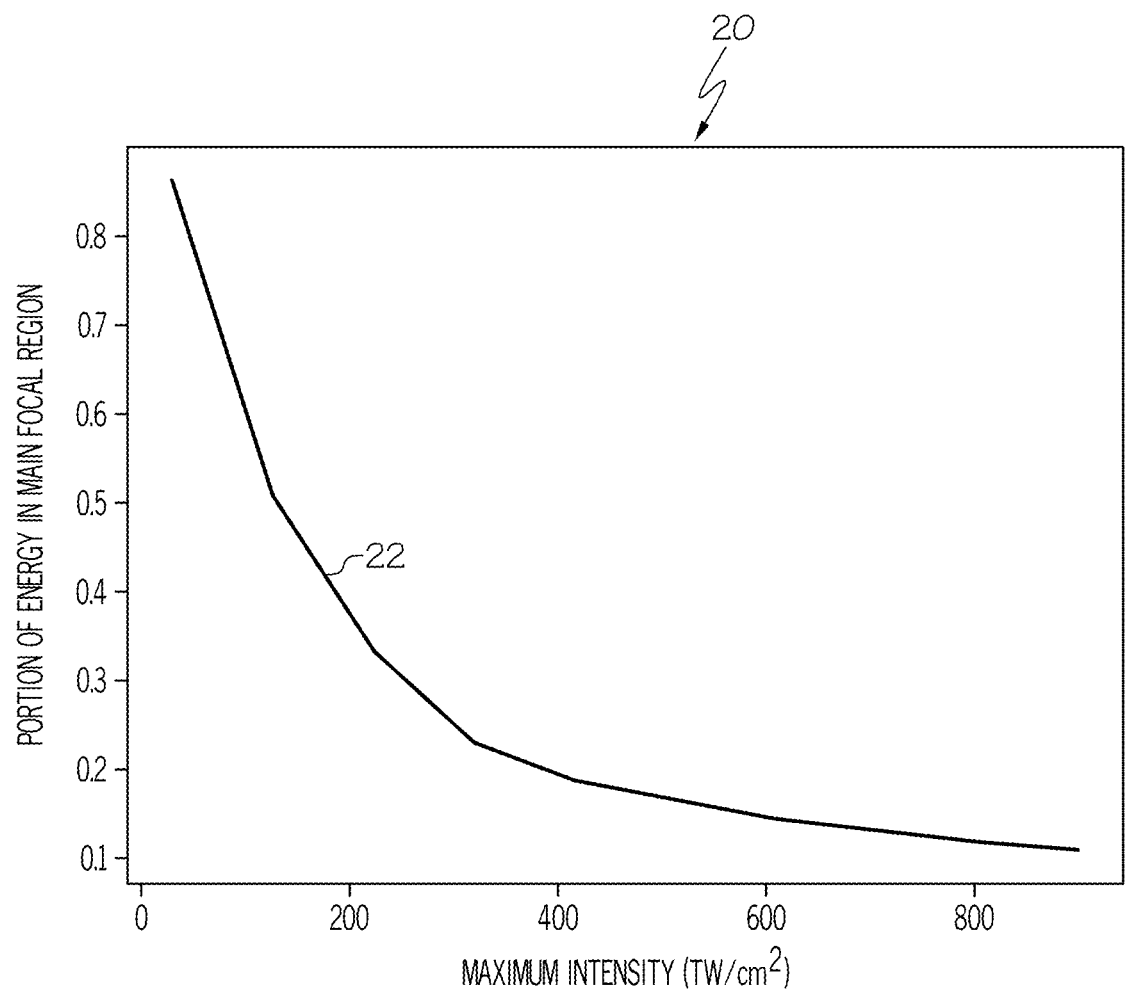
FIG. 7A graphically depicts the portion of total energy in a main lobe of an Airy beam focal region as a function of the intensity of the Airy beam focal region, according to one or more embodiments shown and described herein.

Referring now to FIG. 7A, line 22 of graph 20 depicts the portion (fraction) of total energy in a main lobe 315 of an Airy beam focal region 313 as a function of the maximum intensity of the Airy beam focal region 313. The graph 20 of FIG. 7A was obtained using a transparent workpiece 160 comprising soda line glass having a thickness of 0.2 mm. The decrease in the portion of energy deposited by the main lobe 315 at increased intensities reduces the laser processing effectiveness of the Airy beam focal region 313 by reducing efficiency and increasing unwanted damage caused by the side lobes 316. As used herein, the maximum intensity threshold is the intensity at which half the energy of the Airy beam focal region 313 is disposed in the side lobes 316. Intensities above the maximum intensity threshold will produce large incidental nonlinear effects that will reduce the ability of the Airy beam focal region 313 to generate high quality curved defects 172. In some embodiments, the maximum intensity threshold is 100 TW/cm$^2$, for example, when the transparent workpiece 160 comprises fused silica, aluminosilicate glass, or borosilicate glass. However, it should be understood that material variation may alter the maximum intensity threshold and thus, in some embodiments, the maximum intensity threshold of Airy beam focal region 313 may comprise 200 TW/cm$^2$, 300 TW/cm$^2$, or 400 TW/cm$^2$. While not intending to be limited by theory, example transparent workpieces 160 comprising fused silica comprise a lower nonlinear coefficient of thermal expansion (CTE) than Corning EAGLE XG®, which comprises a lower CTE than Corning Gorilla® Glass and soda lime glass. Thus, the maximum Airy intensity threshold of the Airy beam focal region 313 used to laser process fused silica may be higher than that used to laser process Corning EAGLE XG®, which is turn may be higher than that used to laser process Corning Gorilla® Glass and soda lime glass. In some embodiments, the maximum intensity of the Airy beam focal region 313 comprises 400 TW/cm$^2$ or less, 300 TW/cm$^2$ or less, 200 TW/cm$^2$ or less, 100 TW/cm$^2$ or less, 90 TW/cm$^2$ or less, 80 TW/cm$^2$ or less, 75 TW/cm$^2$ or less, 70 TW/cm$^2$ or less, 60 TW/cm$^2$ or less, 50 TW/cm$^2$ or less, 40 TW/cm$^2$ or less, 30 TW/cm$^2$ or less, 25 TW/cm$^2$ or less, 20 TW/cm$^2$ or less, 15 TW/cm$^2$ or less 10 TW/cm$^2$ or less, 5 TW/cm$^2$ or less, 1 TW/cm$^2$ or less, or any ranges having any two of these values as endpoints. Without intending to be limited by theory, altering the maximum intensity of the Airy beam focal region 313 alters the intensity of the entire Airy beam focal region 313. For example, a doubling of the maximum intensity causes a doubling of intensity throughout the entire Airy beam focal region 313 if other beam parameters are held constant.

Figure 7B:
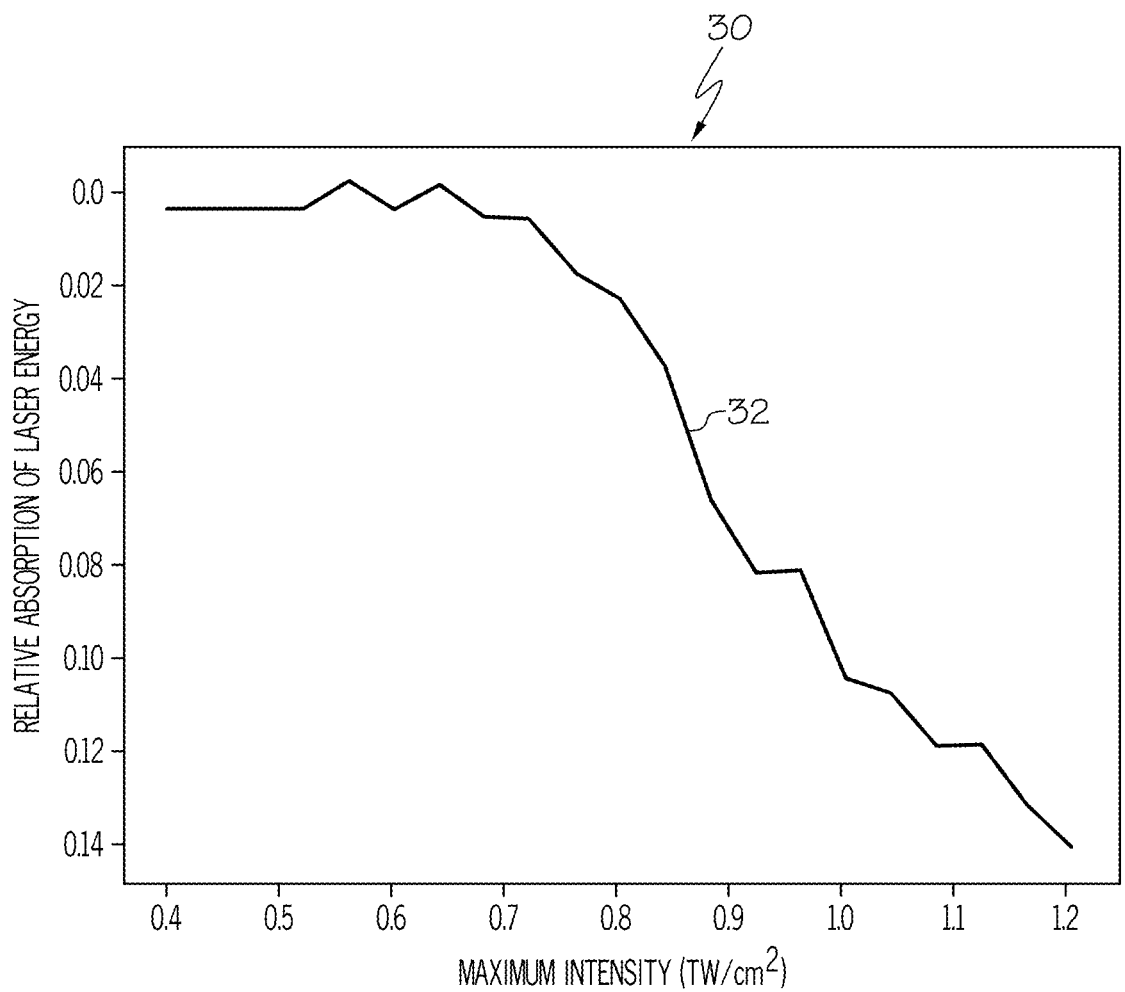
FIG. 7B graphically depicts the relative absorption of laser energy of an Airy beam by the transparent workpiece as a function of the maximum intensity of the Airy beam, according to one or more embodiments shown and described herein.

Referring now to FIG. 7B, a graph 30 depicts the relative absorption of laser energy of the Airy beam focal region 313 by the transparent workpiece 160 as a function of the maximum intensity of the Airy beam focal region 313, shown as line 32. To measure the results depicted by line 32 of graph 30 an experiment was performed to find the intensity at which the onset of nonlinear absorption occurs in the transparent workpiece 160 (i.e., a minimum intensity threshold) by measuring the power of the Airy beam 312 after traversing the transparent workpiece 160. As shown in FIG. 7B, a more than de minimus level of nonlinear absorption in the transparent workpiece 160 occurs at intensities of 0.7 TW/cm$^2$ and above, which is the minimum intensity threshold of the Airy beam focal region 313 when directed into soda lime glass because in the measurements depicted in FIG. 7B, soda lime glass with a 0.2 mm thickness was used as the transparent workpiece 160. It should be understood that material variation may alter the minimum intensity threshold and thus, in some embodiments, the minimum intensity threshold of Airy beam focal region 313 may comprise 0.5 TW/cm$^2$, 0.25 TW/cm$^2$, or 0.125 TW/cm$^2$. It should also be understood that wavelength variation may also alter the minimum intensity threshold and that the minimum intensity threshold value are described herein with respect to a 1064 nm wavelength. Without intending to be limited by theory, transparent workpieces 160 comprising a higher CTE may be modified by Airy beam focal regions 313 having lower minimum intensity thresholds.

In some embodiments, the minimum intensity threshold of the Airy beam focal region 313 comprises 0.125 TW/cm$^2$ or more, 0.15 TW/cm$^2$ or more, 0.2 TW/cm$^2$ or more, 0.3 TW/cm$^2$ or more, 0.4 TW/cm$^2$ or more, 0.5 TW/cm$^2$ or more, 0.6 TW/cm$^2$ or more, 0.7 TW/cm$^2$ or more, 0.75 TW/cm$^2$ or more, 0.8 TW/cm$^2$ or more, 0.9 TW/cm$^2$ or more, 1.0 TW/cm$^2$ or more, or any ranges having any two of these values as endpoints. Furthermore, the maximum intensity threshold and the minimum intensity threshold of the Airy beam focal region 313 described above may be the endpoints of a number of intensity ranges (e.g., ranges of the maximum intensity) of the Airy beam focal region 313 for laser processing the transparent workpiece 160. For example, the maximum intensity threshold of the Airy beam focal region 313 may comprise from 0.125 TW/cm$^2$ to 200 TW/cm$^2$, from 0.125 TW/cm$^2$ to 100 TW/cm$^2$, from 0.5 TW/cm$^2$ to 100 TW/cm$^2$, from 0.7 TW/cm$^2$ to 100 TW/cm$^2$, from 0.125 TW/cm$^2$ to 50 TW/cm$^2$, from 0.7 TW/cm$^2$ to 50 TW/cm$^2$, from 0.7 TW/cm$^2$ to 35 TW/cm$^2$, from 0.7 TW/cm$^2$ to 25 TW/cm$^2$, from 0.7 TW/cm$^2$ to 15 TW/cm$^2$, from 1 TW/cm$^2$ to 50 TW/cm$^2$, from 5 TW/cm$^2$ to 50 TW/cm$^2$, from 1 TW/cm$^2$ to 25 TW/cm$^2$, from 1 TW/cm$^2$ to 10 TW/cm$^2$, or any ranges having any two of these values as endpoints.

Figure 7C:
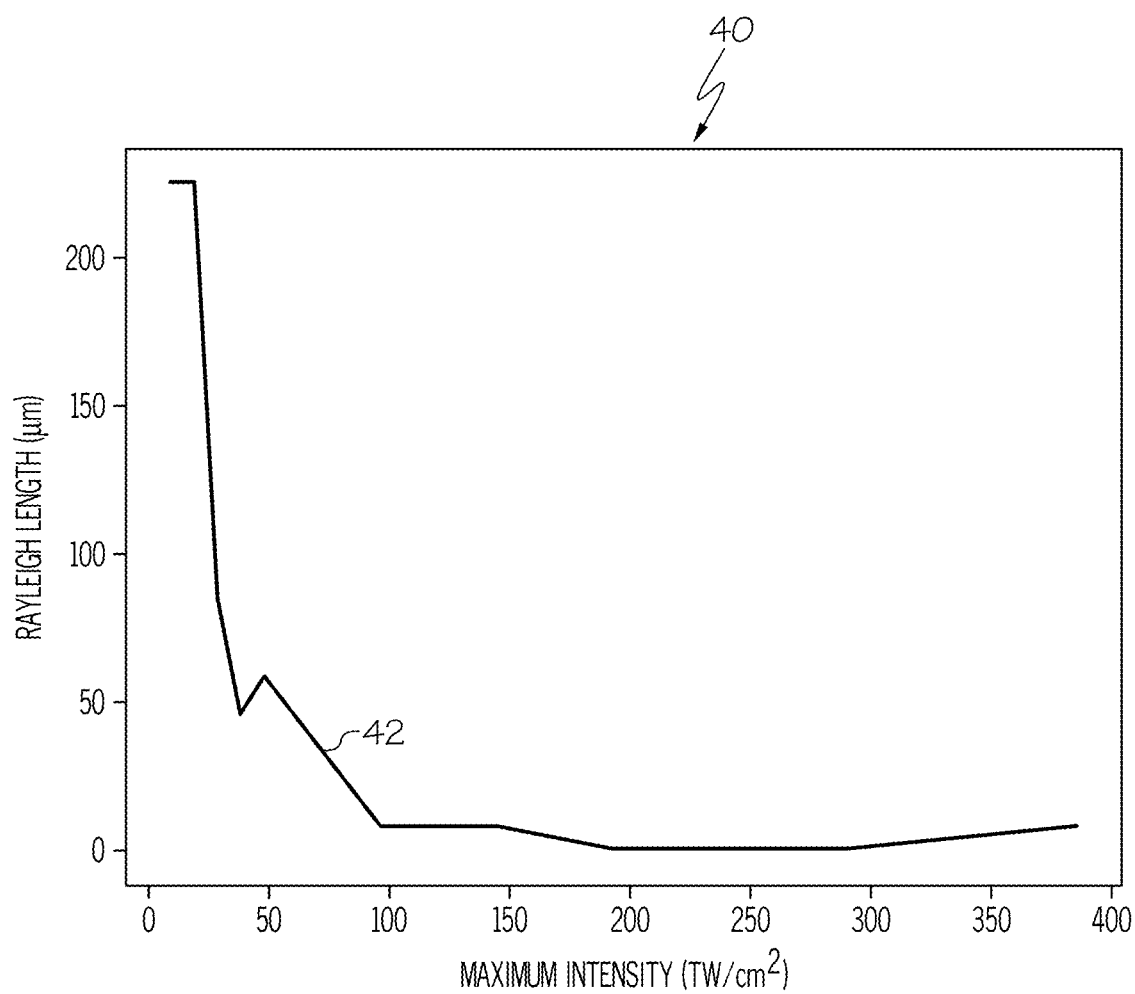
FIG. 7C graphically depicts the Rayleigh length of an Airy beam focal region as a function of the maximum intensity of the Airy beam, according to one or more embodiments shown and described herein.

Referring now to FIG. 7C, line 42 of graph 40 depicts the Rayleigh length of the Airy beam focal region 313 as a function of the maximum intensity of the Airy beam focal region 313. The graph 40 of FIG. 7A was obtained using a transparent workpiece 160 comprising soda line glass having a thickness of 0.2 mm. The Rayleigh length is defined here as the distance from the minimum width of Airy beam focal region 313 to a point where the beam width is equal to $\sqrt{2}$ times the minimum width. As used herein, the width of the Airy beam focal region 313 is the 1/e$^2$ width of the main lobe 315. Without intending to be limited by theory, when Airy beam focal regions 313 comprise a low Rayleigh length, the energy of the Airy beam focal region 313 spreads in directions transverse to the direction of propagation over short distances, thus reducing the intensity of main lobe 315 and its effectiveness for inducing absorption over a long distances to form curved defects 272 that extend through the full thickness of transparent workpiece 160. Indeed, line 42 shows that the Rayleigh length of the Airy beam focal region 313 has a strong negative correlation with increasing the intensity of the Airy beam focal region 313 and shows another benefit of reducing the intensity of the Airy beam focal region 313. For example, FIG. 7C shows a sharp drop in Rayleigh length as the intensity increase to 100 TW/cm$^2$.

Referring now to FIGS. 8A-9B, embodiments will now be described that modify the energy distribution of the Airy beam 312 to increase the amount of laser energy deposited by the main lobe 315 of the Airy beam focal region 313 in the transparent workpiece 160 without increasing maximum intensity (e.g., without increasing maximum intensity beyond the maximum intensity threshold described above). One example of a method to increase deposited laser energy while minimizing incidental nonlinear effects is to shape the intensity profile of the Airy beam focal region 313 into a so-called top-hat function, or other function with weakly varying intensity over an extended distance in a direction transverse to the direction of propagation. The use of a modified Airy beam 312' having such an intensity profile can result in a more consistent distribution of energy through the Airy beam focal region 313 and avoid creating a high-intensity spot in the center of the Airy beam focal region 313. This allows the Airy beam focal region 313 to maintain high enough energy for inducing absorption in the transparent workpiece 160 along its length while maintaining a maximum intensity at or below the maximum intensity threshold. While a top-hat intensity profile is described herein, it should be understood that other intensity profiles may provide benefits in different situations. For example, an Airy beam focal region with an intensity that increases as the Airy beam focal region propagates through the transparent workpiece 160 could be used to counter absorption in the transparent workpiece 160 to maintain a constant intensity throughout the depth of the transparent workpiece 160.

Figure 8A:
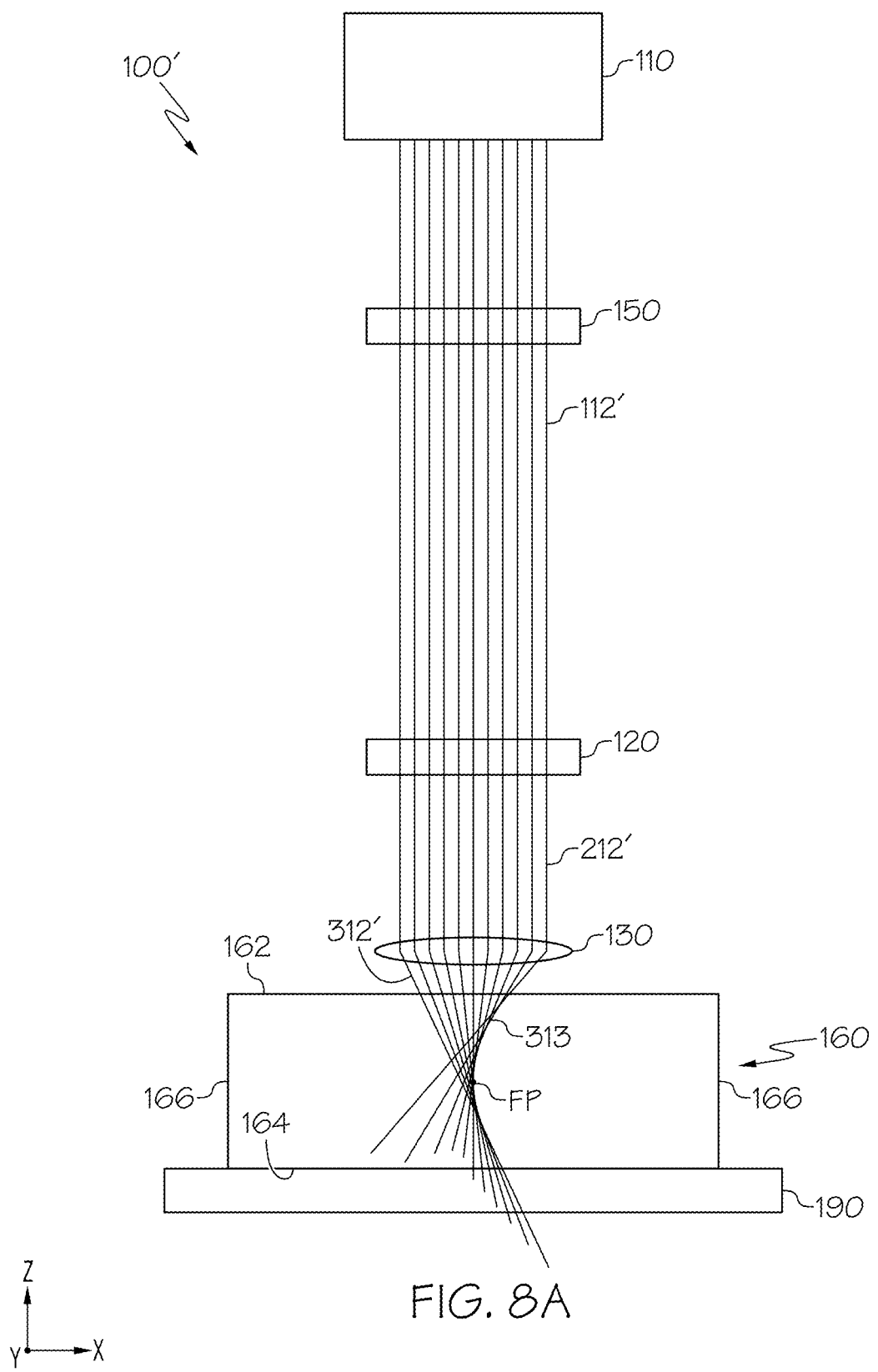
FIG. 8A schematically depicts the optical assembly of FIG. 1 with the addition of a diffractive optical element for modifying the intensity profile of the Airy beam, according to one or more embodiments shown and described herein.
Figure 8B:
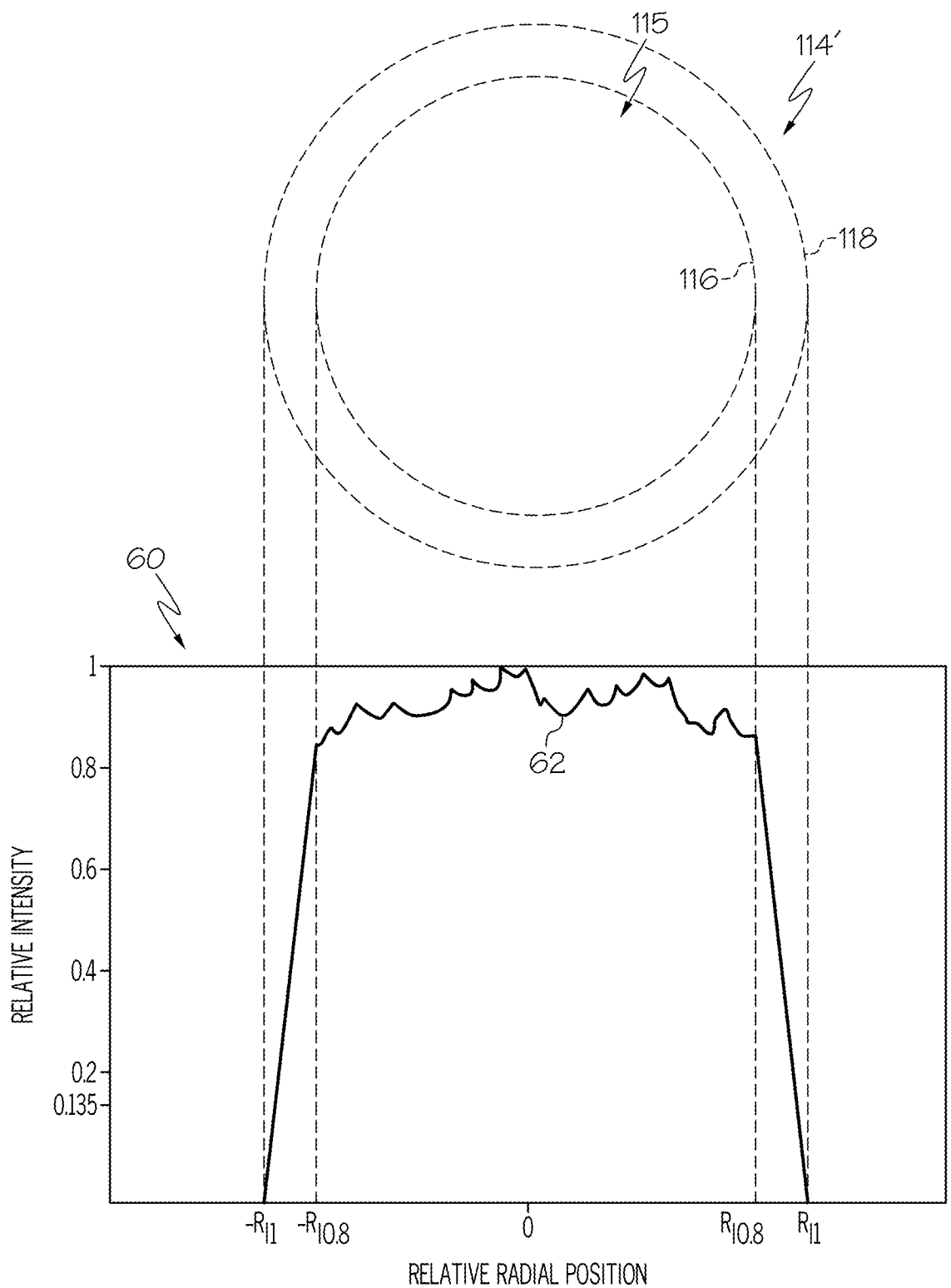
FIG. 8B graphically depicts the relative intensity vs. radial position of a beam spot having a modified intensity profile projected onto the phase-adjustment device for forming a modified Airy beam, according to one or more embodiments shown and described herein.

Referring now to FIGS. 8A and 8B, an optical system 100' is depicted. The optical system 100' is configured to transform the laser beam 112 into a modified phase-adjusted laser beam 212' which, when focused using the focusing lens 130, forms a modified Airy beam 312'. The optical system 100' includes the optical system 100 of FIG. 1A with the addition of a diffractive optical element 150 for modifying the intensity profile of the laser beam 112. In some embodiments, the diffractive optical element 150 comprises a phase mask/plate or a spatial light modulator.

In particular, the laser beam 112 output by the beam source 110 comprises a Gaussian energy distribution and after traversing the diffractive optical element 150 and reaching the phase-adjustment device 120, the laser beam 112 (now modified laser beam 112') comprises a modified, top hat energy distribution. Thus, a beam spot 114' (FIG. 8B) projected by the modified laser beam 112' onto the phase-adjustment device 120 comprises a top hat energy distribution. As used herein, a "top hat energy distribution" refers to an energy distribution in which less than 20% of the total energy of the beam spot (e.g., beam spot 114' of FIG. 8B) has a fluence less than 80% of the maximum fluence. In the illustrative example of FIG. 8B, 80% or more of the total energy of the beam spot 114' is within an inner region (e.g., inner region 115) bounded at 80% of a maximum fluence of the beam spot 114'. In other words, the portion of beam spot 114' having a fluence less than 80% of the maximum fluence accounts for less than 20% of the total energy of beam spot 114'.

Referring now to FIG. 8B, the beam spot 114' formed using the optical assembly 200' of FIG. 8A is schematically depicted in association with a graph 60, which includes line 62 showing the relative fluence as a function of the relative radial position within the beam spot 114'. The relative fluence at the peak of the fluence distribution is normalized to 1 and the balance of the fluence distribution is scaled proportionally. As shown in FIG. 8B, the beam spot 114' includes an outer perimeter 118, an inner perimeter 116, and an inner region 115 bounded by the inner perimeter 116, which is defined by a particular relative fluence, such as 80% of the maximum fluence of the beam spot 114'. In some embodiments, the beam spot 114' comprises an energy distribution in which less than 10% of the total energy of the beam spot 114' has a fluence less than 80% of the maximum fluence. In some embodiments, the beam spot 114' comprises an energy distribution in which less than 5% of the total energy of the beam spot 114' has a fluence less than 80% of the maximum fluence. In some embodiments, the beam spot 114' comprises an energy distribution in which less than 5% of the total energy of the beam spot 114' has a fluence less than 90% of the maximum fluence.

Referring again to FIG. 8A, the modified laser beam 112' with the modified, top hat energy distribution is directed onto the phase-adjustment device 120 to apply a cubic phase modulation to the modified laser beam 112' to form a modified phase-adjusted laser beam 212'. Similar to the optical system 100 of FIG. 1A, the cubic phase modulation applied to form the modified phase-adjusted laser beam 212' is such that, when the modified phase-adjusted laser beam 212' is focused by the focusing lens 130, the modified phase-adjusted laser beam 212' forms into the modified Airy beam 312', which focuses into a modified Airy beam focal region 313' near the focal point FP of the focusing lens 130. Because the modified laser beam 112' comprises a top-hat energy distribution, the resultant modified Airy beam focal region 313' comprises a consistent, more uniform distribution of energy across the main lobe 315 of the modified Airy beam focal region 313', minimizing the maximum intensity of the modified Airy beam focal region 313'. This allows the modified Airy beam focal region 313' to maintain high enough energy to generate induced absorption along its length while maintaining modified Airy beam focal region 313' at or below the maximum intensity threshold to minimize or prevent incidental nonlinear effects.

In some embodiments, the optical system 100' may also include a 4F system comprising a pair of lens (i.e., a first lens upstream a second lens) and a spatial filter between the pair of lenses. The 4F system may be disposed between the diffractive optical element 150 and the phase-adjustment device 120 such that the spatial filter may block the 0$^{th}$ and higher orders of the modified laser beam 112', allowing only the first order of the modified laser beam 112' to traverse the 4F system. In this configuration, the beam spot 114' of FIG. 8B is realized downstream the second lens of the 4F system by one focal length of the second lens in the 4F system and thus the phase-adjustment device 120 may be disposed downstream the second lens of the 4F system by one focal length of the second lens in the 4F system.

Referring now to FIGS. 9A and 9B, an example curved defect 172E formed using the Airy beam focal region 313 of FIG. 1, which is a Gaussian-Airy beam (FIG. 9A) and an example curved defect 172F formed using the modified Airy beam focal region 313' of FIG. 8A, which is formed using a Gaussian beam with a modified (i.e., top hat) energy distribution. The example curved defect 172E of FIG. 9A and the example curved defect 172F of FIG. 9B are each formed with the same laser intensity, that is, the total energy (i.e., the spatially integrated energy). FIG. 9B shows that the top-hat energy distribution improves the quality of the curved defects 172 by increasing the induced absorption imparted by the modified Airy beam focal region 313' throughout the depth of the transparent workpiece 160 and reducing incidental nonlinear effects (evidenced by damage in lateral directions away from curved defect 172E of FIG. 9A). Indeed, FIGS. 9A and 9B show that the modified Airy beam focal region 313' facilitates the use of lower maximum intensities than the Airy beam focal region 313 without reducing the quality of the curved defects 172. For example, the maximum intensity of the modified Airy beam focal region 313' may comprise from 0.125 TW/cm$^2$ to 50 TW/cm$^2$, from 0.7 TW/cm$^2$ to 50 TW/cm$^2$, from 0.7 TW/cm$^2$ to 35 TW/cm$^2$, from 0.7 TW/cm$^2$ to 25 TW/cm$^2$, from 0.7 TW/cm$^2$ to 15 TW/cm$^2$, from 1 TW/cm$^2$ to 50 TW/cm$^2$, from 5 TW/cm$^2$ to 50 TW/cm$^2$, from 1 TW/cm$^2$ to 25 TW/cm$^2$, from 1 TW/cm$^2$ to 10 TW/cm$^2$, from 1 TW/cm$^2$ to 5 TW/cm$^2$, or any ranges having any two of these values as endpoints.

Figure 10:
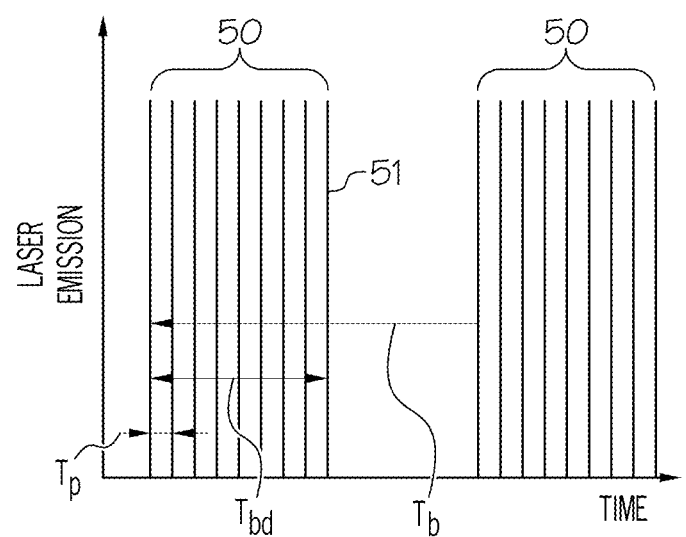
FIG. 10 graphically depicts the relative intensity of laser pulses within an example pulse burst vs. time, according to one or more embodiments described herein.

Referring now to FIGS. 10-12B, embodiments will now be described in which the laser beam 112 comprises a pulsed laser beam such that the Airy beam 312 comprises a pulsed Airy beam comprising pulse bursts having 2 sub-pulses per pulse burst or more. Pulse bursts increase the amount of laser energy deposited by the main lobe 315 of the Airy beam focal region (i.e., a pulsed Airy beam focal region) in the transparent workpiece 160 without increasing the maximum intensity. FIG. 10 graphically depicts the relative intensity of laser pulses within an example pulse burst 50 as a function of time. Each pulse burst 50 comprises at least two sub-pulses 51. For example, each pulse burst 50 may comprise from 2 sub-pulses to 30 sub-pulses, 2 sub-pulses to 20 sub-pulses, from 2 sub-pulses to 15 sub-pulses, from 2 sub-pulses to 12 sub-pulses, from 2 sub-pulses to 10 sub-pulses, from 2 sub-pulses to 5 sub-pulses, or any range having any two of these values as endpoints.

A pulse burst (such as pulse burst 50) is a short and fast grouping of sub-pulses (i.e., a tight cluster of sub-pulses, such as sub-pulses 51) that are emitted by the beam source 110 and interact with the material (i.e. MPA in the material of the transparent workpiece 160). The use of pulse bursts 50 (as opposed to a single pulse operation) increases the size (e.g., the cross-sectional size) of the curved defects 172, which facilitates the connection of adjacent curved defects 172 when separating the transparent workpiece 160 along the contour 170, thereby minimizing crack formation into the bulk of the remainder of the transparent workpiece 160. When the curved defects 172 of the contours 170 are formed with pulse bursts 50 having at least two sub-pulses 51, the force necessary to separate the transparent workpiece 160 along contour 170 (i.e. the break resistance) is reduced compared to the break resistance of a contour 170 of the same shape with the same spacing between adjacent curved defects 172 in an identical transparent workpiece 160 that is formed using a single pulse laser having the same energy as the combined energies of the sub-pulses of the pulse burst 50.

While not intending to be limited by theory, if the Airy beam focal region 313 is directed into the transparent workpiece 160 as a pulse burst (i.e., a pulsed Airy beam focal region) and a time between temporally adjacent sub-pulses is equal to or less than the rate of thermal diffusion in the transparent workpiece 160, then the temperature rise in the transparent workpiece 160 from subsequent sub-pulses is cumulative. This cumulative temperature rise may increase the induced absorption imparted by the Airy beam focal region 313 throughout the depth of the transparent workpiece 160 and reduce incidental nonlinear effects. Each pulse burst 50 may comprise a burst duration (i.e., a time between the start of first sub-pulse in the pulse burst 50 and the end of the final sub-pulse in pulse burst 50) of from 10 ps to 5 ns, such as from 100 ps to 1 ns. Without intending to be limited by theory, by increasing the burst duration, while still retaining a time between temporally adjacent sub-pulses low enough to generate induced absorption and a fast temperature rise in the transparent workpiece 160, more power can be delivered to the transparent workpiece 160 while minimizing or even avoiding unwanted nonlinear effects.

Figure 11A:
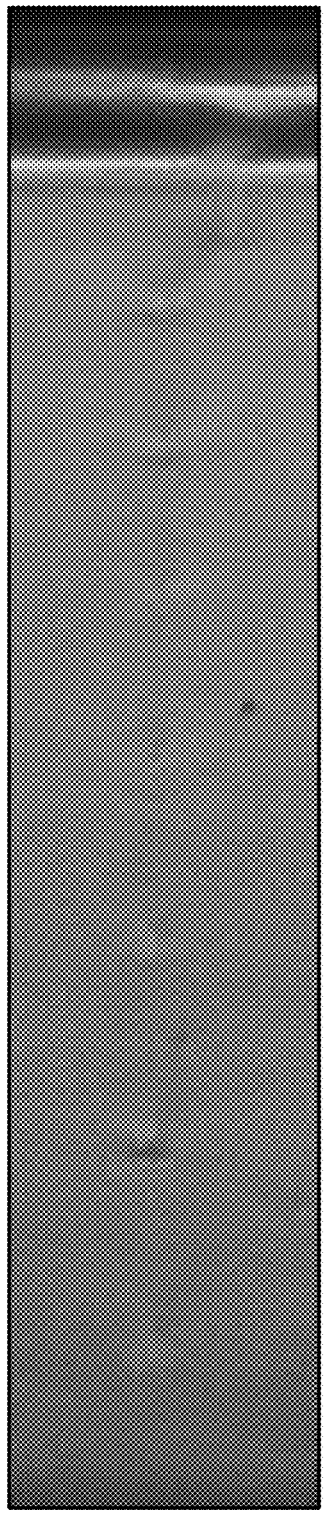
FIG. 11A is a grayscale image of a curved defect formed by an Airy beam focal region generated using a single pulse laser beam, according to one or more embodiments shown and described herein.
Figure 11B:
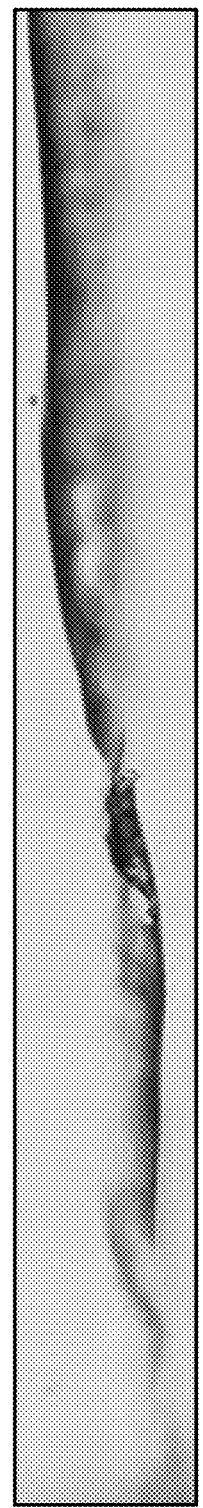
FIG. 11B is a grayscale image of a curved defect formed by an Airy beam focal region generated using a pulse burst laser beam, according to one or more embodiments shown and described herein.

Referring now to FIGS. 11A and 11B, two example curved defects 172G and 172H formed using a single pulse (curved defect 172G) and a pulse burst (curved defect 172H) are depicted. Each curved defects 172G and 172H were formed using the using an Airy beam focal region having an intensity 0.85 TW/cm$^2$, but curved defect 172G of FIG. 11A was formed with a single pulse while curved defect 172H was formed by a pulse burst having 11 sub-pulses, each temporally separated by 20 ns. In FIG. 11A, the curved defect 172G is faint as only a minimal amount of nonlinear absorption occurred. In contrast, the curved defect 172H shown in FIG. 11B, which was formed by a pulse burst having 11 sub-pulses, is better formed than the curved defect 172G and is thus more viable for facilitating separation of the transparent workpiece 160 for the formation a non-square (e.g., bullnose) edge on the resultant separated article. Without intending to be limited by theory, the pulse burst generates a higher peak temperature in the material of the transparent workpiece 160 than a single pulse thus forming a better curved defect. Indeed, FIGS. 11A and 11B show that the pulsed Airy beam focal region facilitates the use of lower maximum intensities than an Airy beam focal region formed with a non-pulsed beam, without reducing the quality of the curved defects 172. For example, the pulsed Airy beam focal region may comprise from 0.125 TW/cm$^2$ to 50 TW/cm$^2$, from 0.7 TW/cm$^2$ to 50 TW/cm$^2$, from 0.7 TW/cm$^2$ to 35 TW/cm$^2$, from 0.7 TW/cm$^2$ to 25 TW/cm$^2$, from 0.7 TW/cm$^2$ to 15 TW/cm$^2$, from 1 TW/cm$^2$ to 50 TW/cm$^2$, from 5 TW/cm$^2$ to 50 TW/cm$^2$, from 1 TW/cm$^2$ to 25 TW/cm$^2$, from 1 TW/cm$^2$ to 10 TW/cm$^2$, from 1 TW/cm$^2$ to 5 TW/cm$^2$, or any ranges having any two of these values as endpoints.

In view of the foregoing description, it should be understood that laser processing of transparent workpieces may comprise forming a contour comprising a plurality of curved defects in the transparent workpiece using a low intensity Airy beam having self-bending characteristics to provide a high throughput process of forming non-square edges within minimal particle generation and unwanted damage. The low intensity Airy beam minimizes unintended damage to the transparent workpiece and facilitate efficient separation with minimal roughness on the resultant non-square edges.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the specific value or end-point referred to is included. Whether or not a numerical value or end-point of a range in the specification recites "about," two embodiments are described: one modified by "about," and one not modified by "about." It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method for processing a transparent workpiece, the method comprising:
    directing a laser beam output by a beam source onto a phase-adjustment device to form a phase-adjusted laser beam;
    directing the phase-adjusted laser beam through a focusing lens to form an Airy beam, the focusing lens having a focal point in the transparent workpiece; and
    directing the Airy beam onto a surface of the transparent workpiece, wherein the Airy beam forms an Airy beam focal region in the thickness direction of the transparent workpiece near the focal point of the focusing lens, the Airy beam of the Airy beam focal region comprising a maximum intensity of 100 TW/cm$^2$ or less, the Airy beam of the Airy beam focal region inducing absorption in the transparent workpiece, wherein the induced absorption produces a defect curved in the thickness direction of the transparent workpiece
    wherein the laser beam traverses a diffractive optical element before being directed to the phase-adjustment device, the diffractive optical element modifying the energy distribution of the laser beam.

2. The method of claim 1, wherein the Airy beam of the Airy beam focal region comprises a main lobe and a plurality of side lobes and at least 50% of the energy of the Airy beam of the Airy beam focal region is disposed in the main lobe.

3. The method of claim 1, wherein the maximum intensity of the Airy beam of the Airy beam focal region is 25 TW/cm$^2$ or less.

4. The method of claim 1, wherein the maximum intensity of the Airy beam of the Airy beam focal region is from 0.7 TW/cm$^2$ to 100 TW/cm$^2$.

5. The method of claim 1, wherein the phase-adjustment device comprises a phase plate having a cubic phase modulation.

6. The method of claim 1, further comprising translating at least one of the transparent workpiece and the Airy beam relative to each other along a contour line to form a contour comprising a plurality of the defects.

7. The method of claim 6, wherein a spacing between adjacent defects of the plurality of defects is 35 μm or less.

8. The method of claim 6, further comprising applying a stress to the contour to separate the transparent workpiece along the contour, thereby forming a non-square edge on the transparent workpiece.

9. A method for processing a transparent workpiece, the method comprising:
    directing a pulsed laser beam output by a beam source onto a phase-adjustment device to form a pulsed phase-adjusted laser beam, the pulsed phase-adjusted laser beam comprising pulse bursts having 2 sub-pulses per pulse burst or more; and
    directing the pulsed phase-adjusted laser beam through a focusing lens to form a pulsed Airy beam, the focusing lens having a focal point in the transparent workpiece;
    directing the pulsed Airy beam onto a surface of the transparent workpiece, wherein the pulsed Airy beam forms a pulsed Airy beam focal region in the thickness direction of the transparent workpiece near the focal point of the focusing lens, the pulsed Airy beam of the pulsed Airy beam focal region comprising a maximum intensity of from 0.125 TW/cm$^2$ to 50 TW/cm$^2$, the pulsed Airy beam of the pulsed Airy beam focal region inducing absorption in the transparent workpiece, wherein the induced absorption produces a defect curved in the thickness direction of the transparent workpiece;
    wherein the laser beam traverses a diffractive optical element before being directed to the phase-adjustment device, the diffractive optical element modifying the energy distribution of the laser beam.

10. The method of claim 9, wherein the maximum intensity of the pulsed Airy beam of the pulsed Airy beam focal region is from 0.7 TW/cm$^2$ to 15 TW/cm$^2$.

11. The method of claim 9, wherein each pulse burst of pulsed laser beam comprises a burst duration of from 10 ps to 5 ns.

12. The method of claim 9, wherein the phase-adjustment device comprises a phase plate having a cubic phase modulation.

13. The method of claim 9, further comprising:
    translating at least one of the transparent workpiece and the pulsed Airy be am relative to each other along a contour line to form a contour comprising a plurality of defects; and
    applying a stress to the contour to separate the transparent workpiece along the contour, thereby forming a non-square edge on the transparent workpiece.

14. A method for processing a transparent workpiece, the method comprising:

directing a laser beam onto a phase-adjustment device such that the laser beam downstream the phase-adjustment device comprises an Airy beam, wherein the laser beam projects a beam spot on the phase-adjustment device, the beam spot comprising an inner region defined by an inner perimeter and an outer region defined by an outer perimeter, the beam spot having an energy distribution in which 80% or more of the total energy of the beam spot is within the inner region and the fluence within the inner region is 80% or more of the maximum fluence of the beam spot; and directing the Airy beam into a surface of the transparent workpiece, wherein the Airy beam forms an Airy beam focal region in the thickness direction of the transparent workpiece, the Airy beam of the Airy beam focal region comprising a maximum intensity of from 0.125 TW/cm$^2$ to 50 TW/cm$^2$, the Airy beam of the Airy beam focal region inducing absorption in the transparent workpiece, wherein the induced absorption produces a defect curved in the thickness direction of the transparent workpiece.

15. The method of claim 14, wherein the maximum intensity of the Airy beam of the Airy beam focal region is from 0.7 TW/cm$^2$ to 15 TW/cm$^2$.

16. The method of claim 14, wherein 90% or more of the total energy of the beam spot is within the inner region.

17. The method of claim 14, wherein 95% or more of the total energy of the beam spot is within the inner region and the fluence within the inner region is 90% or more of the maximum fluence of the beam spot.

18. The method of claim 14, wherein the phase-adjustment device comprises a phase plate having a cubic phase modulation.

19. The method of claim 14, further comprising:

translating at least one of the transparent workpiece and the Airy beam relative to each other along a contour line to form a contour comprising a plurality of defects; and applying a stress to the contour to separate the transparent workpiece along the contour, thereby forming a non-square edge on the transparent workpiece.

\* \* \* \* \*